(12) United States Patent
Jang et al.

(10) Patent No.: US 11,579,401 B2
(45) Date of Patent: Feb. 14, 2023

(54) LIGHT OUTPUT MODULE AND LIDAR

(71) Applicant: LG INNOTEK CO., LTD., Seoul (KR)

(72) Inventors: Young Bae Jang, Seoul (KR); Ji Sung Kim, Seoul (KR); Chang Hyuck Lee, Seoul (KR); Sung Ki Jung, Seoul (KR); Yang Hyun Joo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 944 days.

(21) Appl. No.: 16/327,604

(22) PCT Filed: Aug. 31, 2017

(86) PCT No.: PCT/KR2017/009518
§ 371 (c)(1),
(2) Date: Feb. 22, 2019

(87) PCT Pub. No.: WO2018/044083
PCT Pub. Date: Mar. 8, 2018

(65) Prior Publication Data
US 2019/0187255 A1    Jun. 20, 2019

(30) Foreign Application Priority Data

Sep. 2, 2016  (KR) .................. 10-2016-0113134
Sep. 13, 2016  (KR) .................. 10-2016-0117773

(51) Int. Cl.
*G02B 7/04*    (2021.01)
*G02B 7/08*    (2021.01)
(Continued)

(52) U.S. Cl.
CPC .............. *G02B 7/04* (2013.01); *G01S 7/4814* (2013.01); *G01S 17/08* (2013.01); *G02B 7/021* (2013.01);
(Continued)

(58) Field of Classification Search
CPC ... G03B 5/02; G03B 3/10; G02B 7/09; G02B 7/02; G02B 7/021; G02B 7/04;
(Continued)

(56) References Cited

U.S. PATENT DOCUMENTS

2004/0174614 A1    9/2004  Hovanky
2011/0141340 A1*   6/2011  Yumiki .................... G02B 7/08
                                                    359/699

(Continued)

FOREIGN PATENT DOCUMENTS

CN    103869445 A    6/2014
CN    104181669 A    12/2014
(Continued)

OTHER PUBLICATIONS

Qiu, "Mechatronics Technology," Aug. 31, 2004, 12 pages total, with an English translation.

*Primary Examiner* — Darryl J Collins
*Assistant Examiner* — Tamara Y. Washington
(74) *Attorney, Agent, or Firm* — Birch, Stewart, Kolasch & Birch, LLP

(57) ABSTRACT

The present embodiment relates to a light output module comprising: a first lens part including at least one lens; a second lens part including at least one lens and disposed at a lower side of the first lens part; an actuator for moving the second lens part; a third lens part disposed at a lower side of the second lens part; and a light source disposed at a lower side of the third lens part, wherein the actuator comprises: a first housing receiving the second lens part and including at least one first magnet disposed therein; a second housing receiving the first housing and including at least one second magnet disposed therein; and a third housing including a first coil facing the first magnet and a second coil facing the second magnet, wherein the first housing is operated in a (Continued)

first direction, and the first housing and the second housing are operated in a second direction.

19 Claims, 21 Drawing Sheets

(51) Int. Cl.
*G03B 3/10* (2021.01)
*G01S 17/08* (2006.01)
*G03B 5/02* (2021.01)
*G01S 7/481* (2006.01)
*G02B 7/02* (2021.01)
*G02B 26/08* (2006.01)

(52) U.S. Cl.
CPC ........... *G02B 7/08* (2013.01); *G02B 26/0875* (2013.01); *G03B 3/10* (2013.01); *G03B 5/02* (2013.01)

(58) Field of Classification Search
CPC ....... G02B 7/08; G02B 26/0875; H01S 5/024; H01S 5/00; G01B 9/16; G01S 7/481; G01S 7/4814; G01S 17/08
See application file for complete search history.

(56) References Cited

U.S. PATENT DOCUMENTS

2016/0178736 A1  6/2016  Chung
2017/0012492 A1* 1/2017  Bandera ............... H02K 41/031

FOREIGN PATENT DOCUMENTS

| CN | 104412156 A | | 3/2015 |
|---|---|---|---|
| CN | 104429055 A | | 3/2015 |
| JP | 2001-264453 A | | 9/2001 |
| JP | 2007-298421 A | | 11/2007 |
| JP | 2011-123990 A | | 6/2011 |
| JP | 2011123990 A | * | 6/2011 |
| JP | 2013-210587 A | | 10/2013 |
| KR | 10-2016-0075231 A | | 6/2016 |
| KR | 10-2016-0078043 A | | 7/2016 |

* cited by examiner

LIGHT OUTPUT MODULE AND LIDAR

CROSS REFERENCE TO RELATED APPLICATIONS

This application is the National Phase of PCT International Application No. PCT/KR2017/009518, filed on Aug. 31, 2017, which claims priority under 35 U.S.C. 119(a) to Patent Application No. 10-2016-0113134, filed in the Republic of Korea on Sep. 2, 2016, and Patent Application No. 10-2016-0117773, filed in the Republic of Korea on Sep. 13, 2016, all of which are hereby expressly incorporated by reference into the present application.

TECHNICAL FIELD

The present exemplary embodiment relates to a light output module and LiDAR.

BACKGROUND ART

Light detection and ranging (LiDAR) illuminates light onto an object and can detect distance to object, direction, speed, temperature, material distribution, concentration characteristics, and the like.

Although LiDAR has been utilized for weather observation and distance measurement, recently it has been studied for autonomous driving and unmanned valet parking.

LiDAR comprises a light output module for illuminating light onto an object, and a light receiving module for sensing light reflected from the object. However, the conventional light output module has a problem in that the field of view is fixed depending on the shape of the lens. In addition, when a camera module having an auto focus (AF) function or a camera module having an optical image stabilization (OIS) function is applied to a light output module, a problem occurs in that the amount of displacement of the field of view is limited to a narrow range. Moreover, in this case, a problem occurs in that it is vulnerable to an impact.

Besides, in the conventional light emitting module, there is a problem in that the alignment for the sub-lenses constituting the lens unit cannot be performed. Moreover, in the conventional light emitting module, there is problem in that, once assembled, the lens cannot be moved.

DETAILED DESCRIPTION OF THE INVENTION

Technical Subject

An objective of the present exemplary embodiment is to provide a light output module capable of implementing a wide field of view (FOV) while reducing the lens size. Another objective of the present exemplary embodiment is to provide a light output module having improved rigidity. Yet another objective of the present exemplary embodiment is to provide LiDAR comprising the above mentioned light output module.

Still another objective of the present exemplary embodiment is to provide a light output module capable of active alignment for the movable lenses among the plurality of lenses.

Technical Solution

A light output module according to the present exemplary embodiment comprises: a first lens part comprising at least one lens; a second lens part comprising at least one lens and disposed below the first lens part; an actuator for moving the second lens part; a third lens part disposed below the second lens part; and a light source disposed below the third lens part, wherein the actuator comprises: a first housing accommodating the second lens part and having at least one first magnet disposed therein; a second housing accommodating the first housing and having at least one second magnet disposed therein; and a third housing comprising a first coil facing the first magnet and a second coil facing the second magnet, wherein the first housing is driven towards a first direction, and the first housing and the second housing may be driven towards a second direction.

The second lens part and the first housing move towards the first direction by the interaction between the first magnet and the first coil. The second lens part, the first housing, and the second housing can move towards the second direction by the interaction between the second magnet and the second coil.

When the second lens part moves towards the first direction, the second lens part and the first housing move integrally while the second housing is fixed, and when the second lens part moves towards the second direction, the second lens part, the first housing, and the second housing can move integrally.

The first lens part comprises a first lens at least partially exposed upward and a second lens positioned below the first lens; the second lens part comprises a third lens positioned below the second lens and a fourth lens positioned below the third lens; and the third lens part may comprise a fifth lens positioned below the fourth lens and a sixth lens positioned below the fifth lens.

The light output module may further comprise a holder unit that accommodates the first lens part, the third lens part, and the actuator, and fixes the first lens part and the third lens part.

The holder unit comprises a holder for accommodating the first lens part, the third lens part, and the actuator therein, and a cover which downwardly presses the peripheral portion of the upper surface of the first lens and is screw-coupled to the outer circumferential surface of the holder, wherein the third lens part may further comprise a lens barrel which accommodates the fifth lens and the sixth lens and is screw-coupled to the inner circumferential surface of the holder.

The second lens part can be movable by 2.4 to 3.6 mm towards the first direction and can be movable by 60 to 120 μm towards the second direction.

The field of view (FOV) of the lens unit comprising the first to third lens parts may be 100 to 160 degrees.

The first direction and the second direction may be orthogonal.

LiDAR according to the present exemplary embodiment comprises: a light output module for illuminating light onto an area to be illuminated; and a light receiving module for sensing light reflected from the area illuminated by the light output module, wherein the light output module comprises: a first lens part comprising at least one lens; a second lens part comprising at least one lens and disposed below the first lens part; an actuator for moving the second lens part; a third lens part disposed below the second lens part; and a light source disposed below the third lens part, wherein the actuator comprises: a first housing accommodating the second lens part and having at least one first magnet disposed therein; a second housing accommodating the first housing and having at least one second magnet disposed therein; and a third housing comprising a first coil facing the first magnet and a second coil facing the second magnet, wherein the first housing is driven towards a first direction, and the first housing and the second housing can be driven towards a second direction.

A light output module according to the present exemplary embodiment comprises: a second lens part comprising at least one lens; an actuator for moving the second lens part towards a first direction perpendicular to an optical axis; and a light source disposed below the second lens part, wherein the actuator may comprise: a first housing accommodating the second lens part and having at least one first magnet disposed therein; and a third housing being disposed therein with a first coil facing the first magnet.

A light output module according to the present exemplary embodiment comprises: a holder unit; a first lens part being fixed to the holder unit; a second lens part disposed below the first lens part and movable within the holder unit; a third lens part disposed below the second lens part and fixed to the holder unit; a light source disposed below the third lens part; and a through hole formed in the side wall of the holder unit, wherein a grip portion formed in a lens barrel of the second lens part can be outwardly exposed towards the horizontal direction through the through hole.

The grip portion is protruded towards the radial direction from the outer circumferential surface of the lens barrel of the second lens part and may comprise a plurality of protrusions spaced apart from one another.

The grip portion may be formed at the lower end of the lens barrel of the second lens part.

It further comprises an actuator disposed inside the holder unit for moving the second lens part, and the actuator comprises: a first housing coupled with the second lens part; a first screw thread is formed on the outer circumferential surface of the lens barrel of the second lens part; and a second screw thread corresponding to the first screw thread may be formed on the inner circumferential surface of the first housing.

Each of the protrusions, at least a portion thereof, may be formed in a way that the width thereof is getting narrower as it travels outwardly from the outer circumferential surface of the lens barrel of the second lens part.

The length along the wider axis of the through hole may be longer than the length along the wider axis of the protrusion.

The pitch of the first screw thread may be between 0.2 and 0.4 mm.

The plurality of protrusions comprises eight protrusions, and the eight protrusions are disposed equally spaced apart on the outer circumferential surface of the lens barrel of the second lens part. When the lens barrel of the second lens part is rotated by the distance between the adjacent protrusions among the eight protrusions, the second lens part may be moved by 30 and 50 μm along the optical axis.

The actuator may further comprise: a second housing disposed at the outer side of the first housing; a third housing disposed at the outer side of the second housing; a first magnet disposed in the first housing; a first coil disposed in the second housing and facing the first magnet; a second magnet disposed in the second housing; and a second coil disposed in the third housing and facing the second magnet.

The actuator may further comprise: a second housing disposed at the outer side of the first housing; a third housing disposed at the outer side of the second housing; a first magnet disposed in the first housing; a second magnet disposed in the second housing; a first coil disposed in the third housing and facing the first magnet; and a second coil disposed in the third housing and facing the second magnet.

LiDAR according to the present exemplary embodiment comprises: a light output module for illuminating light onto an area to be illuminated; and a light receiving module for sensing light reflected from the area illuminated by the light output module, wherein the light output module comprises: a substrate; a light source disposed on the upper surface of the substrate; a holder unit disposed on the upper surface of the substrate; a first lens part being fixed to the holder unit; a second lens part disposed below the first lens part and movable within the holder unit; a third lens part disposed below the second lens part and fixed to the holder unit; and a through hole formed in the side wall of the holder unit, wherein a grip portion formed in a lens barrel of the second lens part can be outwardly exposed through the through hole.

Advantageous Effects

Through the present exemplary embodiment, scanning of the light source can be implemented. In addition, the total length of the lens driving device can be reduced owing to the reduction in the lens size; the wide field of view can be implemented; and adjustment of field of view along the x-axis and y-axis become possible. Also, the durability is enhanced as the rigidity is reinforced.

Though the present exemplary embodiment, active alignment can be performed on the movable lenses corresponding to a part of the plurality of lenses.

BEST MODE

Figure 1:
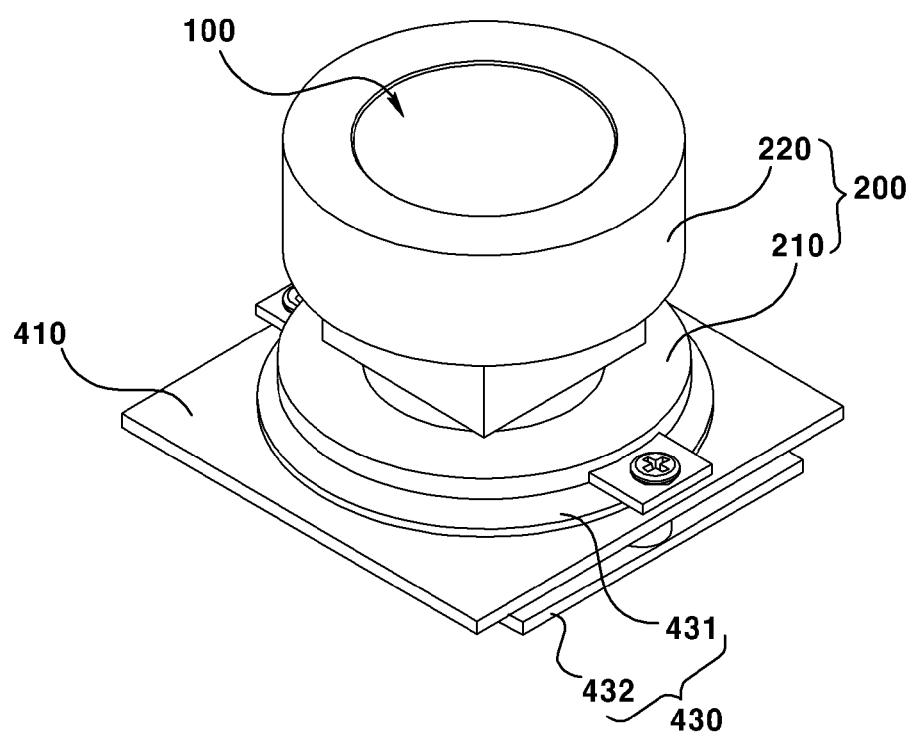
FIG. 1 is a perspective view illustrating a light output module according to the first exemplary embodiment of the present invention.

Hereinafter, some exemplary embodiments of the present invention will be described with reference to exemplary drawings. In describing the components in the drawings, the same components are denoted by the same reference numerals whenever possible, even if they are shown on other drawings. In the following description of the exemplary embodiments of the present invention, a detailed description of known functions and configurations incorporated herein will be omitted when it may hinder the understanding of the exemplary embodiments of the present invention.

In describing the components of the embodiment of the present invention, terms such as first, second, A, B, (a), and (b) may be used. These terms are merely intended to distinguish the components from other components, and the terms do not limit the nature, order or sequence of the components. When a component is described as being "connected", "coupled", or "jointed" to another component, the component may be directly connected, coupled, or jointed to the other component, however, it should be understood that another element may be "connected", "coupled" or "jointed" between components.

Hereinafter, any one of the first magnet 313, the first coil 314, the second magnet 323, and the second coil 324 will be referred to as a 'first driving part' and the other as a 'second driving part' and another one may be referred to as a 'third driving part', and the remaining one may be referred to as a 'fourth driving part'. On the other hand, the magnets 313 and 323, and the coils 314 and 324 may be disposed with their positions interchanged.

Hereinafter, the configuration of LiDAR according to the exemplary embodiment will be described.

LiDAR according to the present exemplary embodiment illuminates light onto an object and can detect distance to object, direction, speed, temperature, material distribution, concentration characteristics, and the like.

LiDAR can be utilized for weather observation, distance measurement, and the like. Also, LiDAR can be used for autonomous driving and unmanned ballet parking.

LiDAR according to the present exemplary embodiment may comprise a light output module and a light receiving module. LiDAR may comprise a light output module for illuminating light onto an area to be illuminated. LiDAR may comprise a light receiving module for sensing the light reflected from the area illuminated by the light output module.

The light receiving module can sense the light reflected from the area to be illuminated by the light output module. The light receiving module can be manufactured by replacing the light source 420 in the light output module with a light receiving sensor (not shown).

The light receiving module may comprise a substrate 410, a light receiving sensor, and a lens, and may further comprise a heat dissipating member 430 or a lens driving device. In the light receiving module, at least any one of the substrate 410, the light receiving sensor, the heat dissipating member 430, and the lens driving device may be omitted or changed. Especially, the heat dissipating member 430 or the lens driving device in the light receiving module may be omitted. As for the description of the substrate 410, the heat dissipating member 430, and the lens driving device of the light receiving module, the description of the substrate 410, the heat dissipating member 430, and the lens driving device of the light output module, which will be described hereinafter, can be applied analogously.

The light receiving sensor may be disposed on the substrate 410. The light receiving sensor may be electrically connected to the substrate 410. For an example, the light receiving sensor can be coupled to the substrate 410 by surface mounting technology (SMT). For another example, the image sensor can be coupled to the substrate 410 by a flip chip technology. The light receiving sensor can detect infrared light. However, it is not limited thereto.

The light output module can illuminate light onto an area to be illuminated. The light output module may comprise a laser diode. The light output module can illuminate infrared light. However, it is not limited thereto.

Hereinafter, the configuration of the light output module according to the first exemplary embodiment of the present invention will be described.

Figure 2:
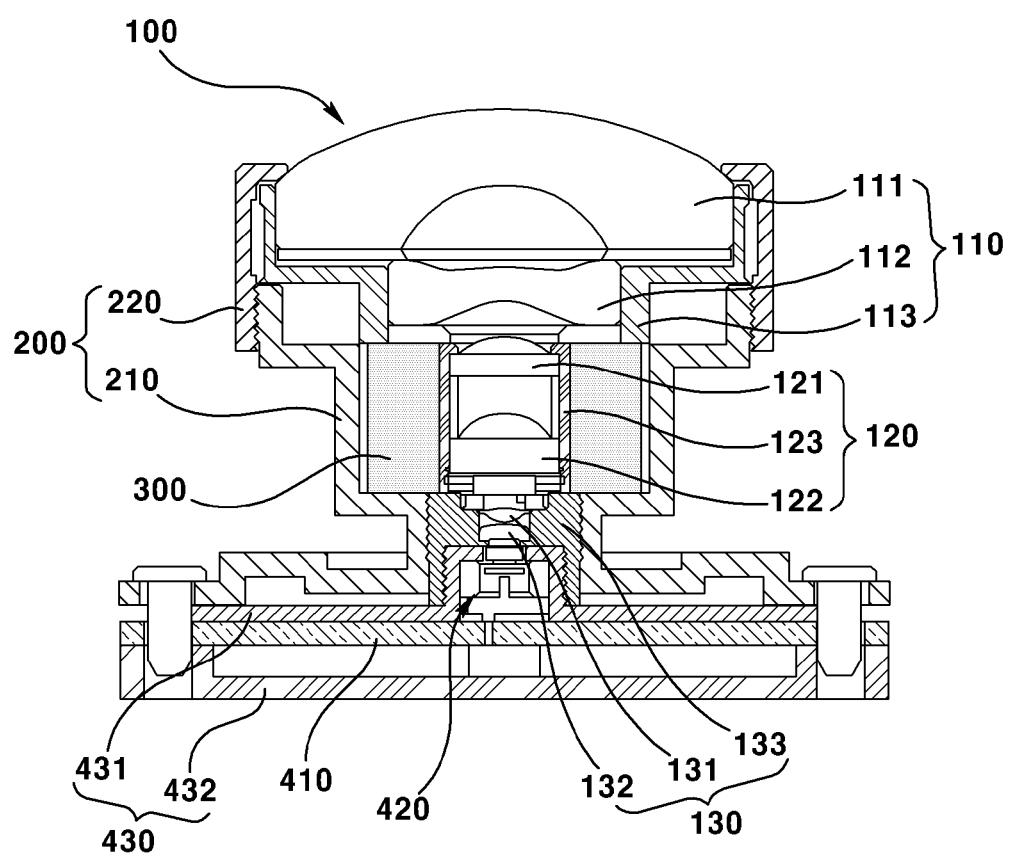
FIG. 2 is a cross-sectional view illustrating a light output module according to the first exemplary embodiment of the present invention.
Figure 3:
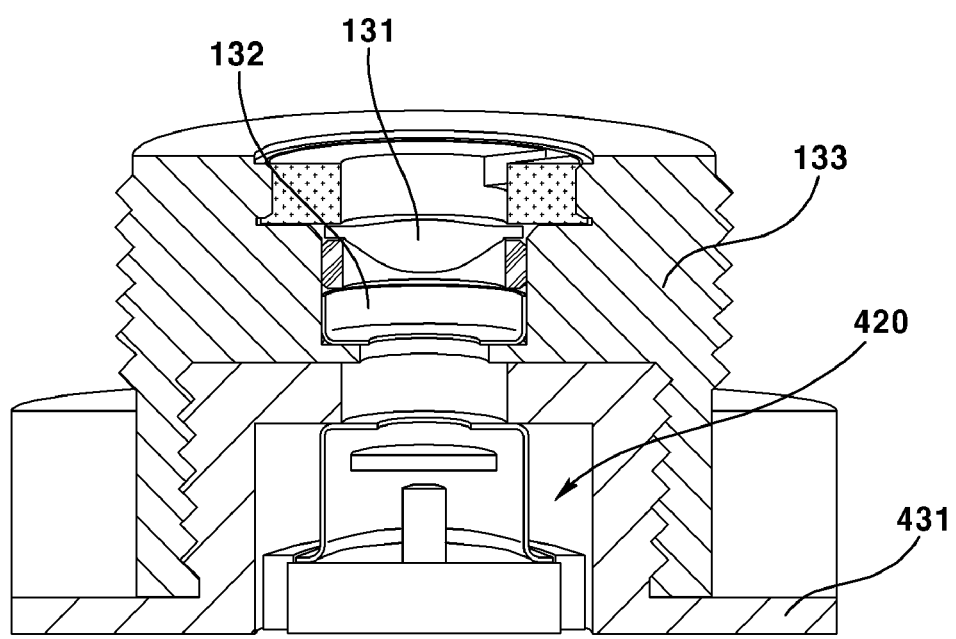
FIG. 3 is a partially cutaway cross-sectional perspective view illustrating a light output module according to the first exemplary embodiment of the present invention.
Figure 4:
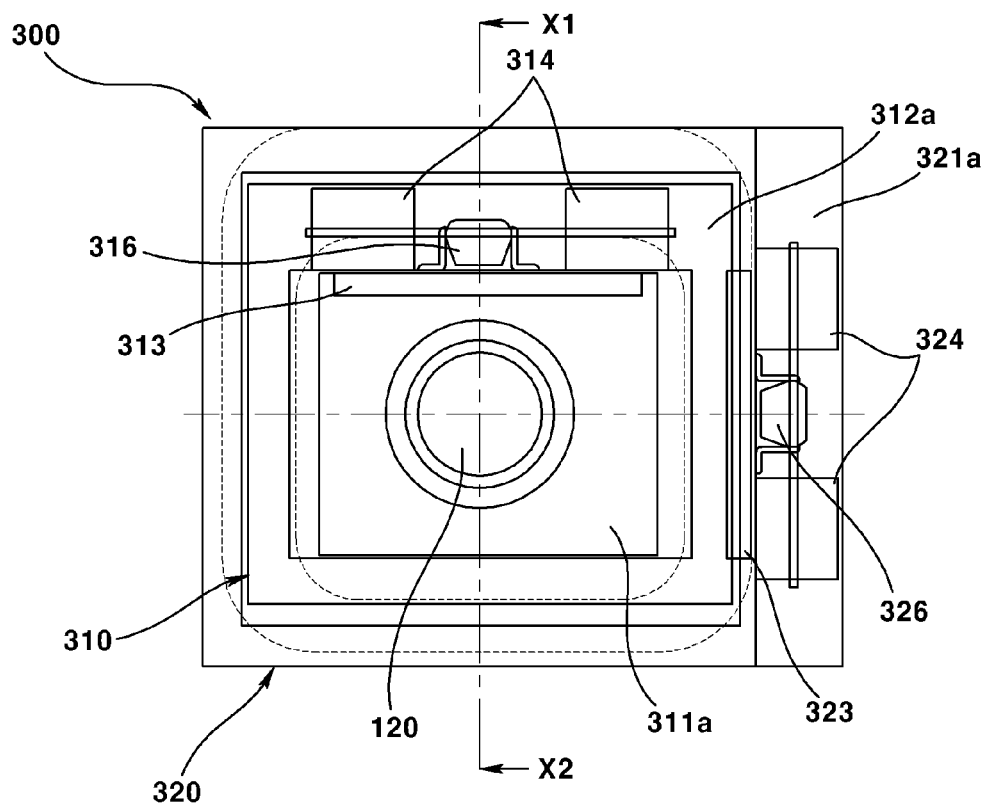
FIG. 4 is a see-through view illustrating an actuator of a light output module according to the first exemplary embodiment of the present invention.
Figure 5:
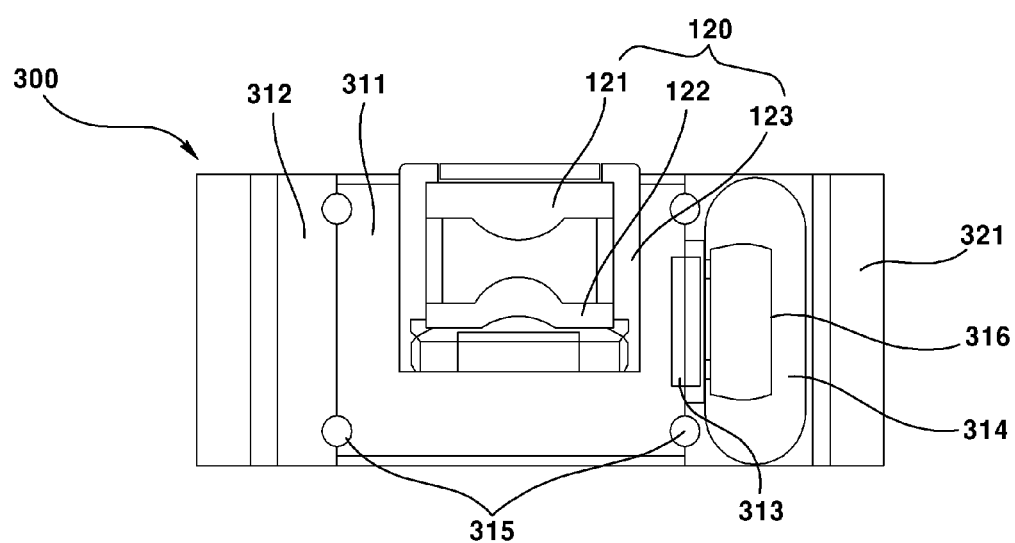
FIG. 5 is a cross-sectional view, viewing from the line X1-X2 in FIG. 4.

FIG. 1 is a perspective view illustrating a light output module according to the first exemplary embodiment of the present invention; FIG. 2 is a cross-sectional view illustrating a light output module according to the first exemplary embodiment of the present invention; FIG. 3 is a partially cutaway cross-sectional perspective view illustrating a light output module according to the first exemplary embodiment of the present invention; FIG. 4 is a see-through view illustrating an actuator of a light output module according to the first exemplary embodiment of the present invention; and FIG. 5 is a cross-sectional view, viewing from the line X1-X2 in FIG. 4.

The light output module according to the present exemplary embodiment may comprise a substrate 410, a light source 420, a heat dissipating member 430, and a lens driving device. However, in the light output module according to the present exemplary embodiment, at least any one of the substrate 410, the light source 420, the heat dissipating member 430, and the lens driving device may be omitted or changed. Especially, the heat dissipating member 430, a member for radiating heat generated in the light source 420, may be omitted or may be replaced with another member.

The substrate 410 may be coupled to the light source 420. The substrate 410 may be electrically connected to the light source 420. In this case, the substrate 410 can supply a current required for driving the light source 420. A light source 420 and a first heat sink 431 may be coupled to the substrate 410. The light source 420 and the first heat sink 431 may be coupled to the upper surface of the substrate 410. A second heat sink 432 may be coupled to the substrate 410. The second heat sink 432 may be coupled to the lower surface of the substrate 410. The substrate 410 may be a printed circuit board (PCB). However, it is not limited thereto.

The light source 420 may be positioned below the lens unit 100. The light source 420 may be positioned below the third lens part 130. The light source 420 may be coupled to the substrate 410. The light source 420 may be electrically connected to the substrate 410. In this case, the light source 420 can receive power from the substrate 410. The light source 420 may be a laser diode or a VCSEL. The light source 420 can illuminate infrared light. However, it is not limited thereto.

The heat dissipating member 430 may be in contact with at least any one of the light source 420 and the substrate 410. The heat dissipating member 430 may be coupled to the light source 420. The heat dissipating member 430 may be coupled to the substrate 410. The heat dissipating member 430 may radiate heat generated in the light source 420. That is, the heat dissipating member 430 can prevent the light source 420 and/or the substrate 410 from being damaged by the heat generated by the operation of the light source 420.

The heat dissipating member 430 may comprise a first heat sink 431 and a second heat sink 432. At least any one of the first heat sink 431 and the second heat sink 432 may be omitted or changed in the heat dissipating member 430.

The first heat sink 431 may be disposed on the upper side of the substrate 410. In this case, the first heat sink 431 may be referred to as an 'upper heat sink'. The first heat sink 431 may be coupled to the upper surface of the substrate 410 on which the light source 420 is disposed. The first heat sink 431 may be in contact with the upper surface of the substrate 410. The light source 420 may be positioned between the first heat sink 431 and the substrate 410. That is, the first heat sink 431 can accommodate at least a portion of the light source 420. The first heat sink 431 may formed to have a shape corresponding to that of the light source 420 at the portion thereof. The first heat sink 431 may comprise a disc-shaped body, and a protrusion that is upwardly protruded from the body and internally accommodates the light source 420. A screw thread may be formed on the outer circumferential surface of the protrusion. The third lens barrel 133 may be coupled to the thread of the protrusion.

The second heat sink 432 may be disposed below the substrate 410. In this case, the second heat sink 432 may be referred to as a 'lower heat sink'. The second heat sink 432 may be coupled to the lower surface of the substrate 410. The second heat sink 432 may be spaced apart at least partially from the lower surface of the substrate 410. The second heat sink 432 may be coupled to the first heat sink 431 by a coupling member penetrating the substrate 410. At this time, the coupling member may be a bolt or a screw. Alternatively, the second heat sink 432 may be coupled to a holder unit 200 by a coupling member penetrating the substrate 410 and the first heat sink 431.

The lens driving device may be coupled to the substrate 410. The lens driving device may be disposed on the upper side of the substrate 410. The lens driving device may be disposed on the upper surface of the substrate 410. The light emitted from the light source 420 may be emitted to the outside of the light output module through the lens driving device.

The lens driving device may comprise a lens unit 100, a holder unit 200, and an actuator 300. However, at least any one of the lens unit 100, the holder unit 200, and the actuator 300 in the lens driving device may be omitted or changed.

The lens unit 100 may be disposed on the upper side of the light source mounted on the substrate 410. The lens unit 100 may be disposed so as to be overlapped with the light source 420 mounted on the substrate 410. Through such a structure, the light emitted from the light source 420 can be emitted to the outside through the lens unit 100. The lens unit 100 can change the path of at least part of the light emitted from the light source 420. The lens unit 100 can change the emitting direction of light finally emitted from the light output module. The lens unit 100 may comprise a plurality of lenses and a barrel for fixing the plurality of lenses. The lens unit 100 may comprise a plurality of lens groups. The lens unit 100 may comprise, for example, three lens groups comprising a focusing lens unit, a steering lens unit, and an expanding lens unit. The lens unit 100 may comprise one or a combination of at least any one among the three lens groups. The lens unit 100 may comprise only the steering lens unit comprising one or more lenses. The lens unit 100 may comprise a total of six lenses. The lens unit 100 may comprise first to sixth lenses 111, 112, 121, 122, 131, and 132. At this time, at least any one of the first through sixth lenses 111, 112, 121, 122, 131, and 132 may be an aspherical lens. Alternatively, the first to sixth lenses 111, 112, 121, 122, 131, and 132 may be aspherical lenses.

The field of view (FOV) of the lens unit 100 may be between 100° and 160°. An angle of view of the lens unit 100 may be formed by driving the actuator 300. That is, the angle of view of the lens unit 100 can be obtained as the actuator 300 moves at least a part of the lens unit 100.

The lens unit 100 may comprise a first lens part 110, a second lens part 120, and a third lens part 130. However, at least any one of the first lens part 110, the second lens part 120, and the third lens part 130 in the lens unit 100 may be omitted or changed. The lens unit 100 may comprise a focusing lens unit, a steering lens unit, and an expanding lens unit. The first lens part 110, the second lens part 120, and the third lens part 130 may be any one of the focusing lens unit, the steering lens unit, and the expanding lens unit. At this time, the first lens part 110 may be referred to as an 'expanding lens unit', the second lens part 120 may be referred to as a 'steering lens unit', and the third lens part 130 may be referred to as a 'focusing lens unit'. The focusing lens unit can play the role of collecting light. The steering lens unit may be driven to play the role of changing the optical path finally outputted from the light output module. The expanding lens unit can play the role of making the output angle of the light incident on the expanding lens unit to be larger.

The lens unit 100 may comprise a first lens part 110. At least a portion of the first lens part 110 may be upwardly exposed. The lens unit 100 may comprise a second lens part 120 positioned below the first lens part 110. The lens unit 100 may comprise a third lens part 130 positioned below the second lens part 120. The first lens part 110, the second lens part 120, and the third lens part 130 may be sequentially disposed from the upper side towards the lower side. At this time, the light source 420 may be positioned below the third lens part 130. However, the first lens part 110, the second lens part 120, and the third lens part 130 may be disposed in a different order.

At least a portion of the first lens part 110 may be accommodated in the holder unit 200. The central portion of the first lens part 110 may be externally exposed. The central portion of the first lens part 110 may be upwardly exposed. The side surface, the peripheral portion, or the lower portion of the first lens part 110 can be accommodated by the holder unit 200. The outer or peripheral portion of the upper surface of the first lens part 110 may be pressed down by the cover 220 and fixed.

The first lens part 110 may comprise a first lens 111, a second lens 112, and a first lens barrel 113. However, at least any one of the first lens 111, the second lens 112, and the first lens barrel 113 in the first lens part 110 may be omitted or changed. The first lens part 110 may comprise a first lens 111 at least a portion thereof is upwardly exposed. The first lens part 110 may comprise a second lens 112 positioned below the first lens 111.

At least a portion of the first lens 111 may be accommodated in the holder unit 200. At least a portion of the first lens 111 may be upwardly exposed. The center portion of the first lens 111 may be externally exposed. The central portion of the first lens 111 may be upwardly exposed. The peripheral portion of the first lens 111 may be accommodated by the holder unit 200. The peripheral portion of the upper surface of the first lens 111 may be pressed down by the cover 220 and fixed. The first lens 111 may have the largest diameter as compared with the second through sixth lenses 112, 121, 122, 131, and 132.

The second lens 112 may be positioned below the first lens 111. The second lens 112 may be positioned above the third lens 121. The diameter of the second lens 112 may be smaller than the diameter of the first lens 111 but larger than the diameter of the third lens 121. The second lens 112 may be disposed such that the optical axis thereof coincides with the first lens 111.

The first lens barrel 113 can accommodate at least a portion of the first lens 111. The first lens barrel 113 can accommodate at least a portion of the second lens 112. The first lens barrel 113 can support the outer circumferential surface of the first lens 111. The first lens barrel 113 can support the outer circumferential surface of the second lens 112. The first lens barrel 113 can be accommodated in the holder unit 200. The first lens barrel 113 can be accommodated inside the cover 220. At least a portion of the first lens barrel 113 may be seated in the holder 210. At least a portion of the lower surface of the first lens barrel 113 can be supported by the holder 210. At least a portion of the first lens barrel 113 may have a shape corresponding to the holder 210.

The second lens part 120 may be coupled to the actuator 300. The second lens part 120 can be moved by the actuator 300. The second lens part 120 can move towards the direction perpendicular to the optical axis of the lens unit 100. The movement of the second lens part 120 towards the direction of the optical axis of the lens unit 100 may be restricted. The upper end of the second lens part 120 may be in direct contact with the first lens part 110. The upper end of the second lens part 120 can support the lower end of the first lens part 110. The lower end of the second lens part 120 may be in direct contact with the third lens part 130. The lower end of the second lens part 120 may be supported by the third lens part 130.

The second lens part 120 can move along a first direction perpendicular to the optical axis of the lens unit 100 or a first axis direction. The second lens part 120 can move along a second direction that is perpendicular to the optical axis of the lens unit 100 and different from the first axis direction or a second axis direction. At this time, the first direction and the second direction may be orthogonal to each other. Further, the first axis direction and the second axis direction may be orthogonal. In this case, the first axis direction may be referred to as an 'X-axis direction' and the second axis direction may be referred to as a 'Y-axis direction'. The second lens part 120 may be moved by 2.4 mm to 3.6 mm along the first axis direction. The second lens part 120 may be moved by 60 to 120 μm along the second axis direction. In this case, the field of view of the lens unit 100 can be secured to 120 to 160 degrees.

The second lens part 120 may comprise a third lens 121, a fourth lens 122, and a second lens barrel 123. However, at least any one of the third lens 121, the fourth lens 122, and the second lens barrel 123 in the second lens part 120 may be omitted or changed. The second lens part 120 may comprise a third lens 121 positioned below the second lens 112. The second lens part 120 may comprise a fourth lens 122 positioned below the third lens 121. The third lens 121 and the fourth lens 122 can be moved by the actuator 300. In this case, the third lens 121 and the fourth lens 122 may be referred to as a 'movable lens'.

The third lens 121 may be positioned below the second lens 112. The third lens 121 may be positioned above the fourth lens 122. The third lens 121 may be fixed to the second lens barrel 123. The third lens 121 may be coupled to the actuator 300. The third lens 121 can be moved by the actuator 300. The third lens 121 may be arranged so that its optical axis coincides with the fourth lens 122. The diameter of the third lens 121 may correspond to the diameter of the fourth lens 122.

The fourth lens 122 may be positioned below the third lens 121. The fourth lens 122 may be positioned above the fifth lens 131. The fourth lens 122 may be fixed to the second lens barrel 123. The fourth lens 122 may be coupled to the actuator 300. The fourth lens 122 can be moved by the actuator 300.

The second lens barrel 123 can accommodate at least a portion of the third lens 121. The second lens barrel 123 can accommodate at least a portion of the fourth lens 122. The second lens barrel 123 can support the outer circumferential surface of the third lens 121. The second lens barrel 123 can support the outer circumferential surface of the fourth lens 122. The second lens barrel 123 can be accommodated in the holder unit 200. The second lens barrel 123 may be coupled to the actuator 300. The second lens barrel 123 can be moved by the actuator 300. At least a portion of the lower surface of the second lens barrel 123 can be supported by the third lens barrel 133.

The third lens part 130 can be accommodated in the holder 210. The third lens part 130 may be positioned below the second lens part 120. The third lens part 130 may be positioned above the light source 420. The outer circumferential surface of the third lens part 130 may be in contact with the inner circumferential surface of the holder 210. The outer circumferential surface of the third lens part 130 may be screw-coupled to the inner circumferential surface of the holder 210. The inner circumferential surface of the third lens part 130 may be in contact with the outer circumferential surface of the first heat sink 431. The inner circumferential surface of the third lens part 130 may be screw-coupled to the outer circumferential surface of the first heat sink 431.

The third lens part 130 may comprise a fifth lens 131, a sixth lens 132, and a third lens barrel 133. However, at least any one of the fifth lens 131, the sixth lens 132, and the third lens barrel 133 in the third lens part 130 may be omitted or changed. The third lens part 130 may comprise a fifth lens 131 positioned below the fourth lens 122. The third lens part 130 may comprise a sixth lens 132 positioned below the fifth lens 131. The third lens part 130 may comprise a third lens barrel 133 that accommodates the fifth lens 131 and the sixth lens 132 and is screw-coupled to the inner circumferential surface of the holder 210.

The fifth lens 131 may be positioned below the fourth lens 122. The fifth lens 131 may be positioned above the sixth lens 132. The fifth lens 131 may be supported by the third lens barrel 133. The fifth lens 131 can be accommodated in the holder 210. The fifth lens 131 may be disposed such that the optical axis thereof coincides with the first lens 111 and the second lens 112. The fifth lens 131 may be a lens for focusing. In this case, the fifth lens 131 may be referred to as a 'focusing lens'.

The sixth lens 132 may be positioned below the fifth lens 131. The sixth lens 132 may be positioned above the light source 420. The sixth lens 132 may be supported by the third lens barrel 133. The sixth lens 132 may be accommodated in the holder 210. The sixth lens 132 may be disposed such that the optical axis thereof coincides with the fifth lens 131. The sixth lens 132 may be a lens for collimating. That is, the sixth lens 132 can generate parallel light from the light illuminated from the light source 420. In this case, the sixth lens 132 may be referred to as a 'collimating lens'.

The third lens barrel 133 can accommodate the fifth lens 131. The third lens barrel 133 can accommodate the sixth lens 132. The third lens barrel 133 can support the outer circumferential surface of the fifth lens 131. The third lens barrel 133 can support the outer circumferential surface of the sixth lens 132. The third lens barrel 133 may be screw-coupled to the inner circumferential surface of the holder 210. The third lens barrel 133 may be screw-coupled to the outer circumferential surface of the first heat sink 431.

The holder unit 200 can accommodate at least a portion of the lens unit 100. The holder unit 200 can fix the first lens part 110. The holder unit 200 can fix the third lens part 130. The holder unit 200 can movably accommodate the second lens part 120 therein. That is, the holder unit 200 fixes the first lens part 110 and the third lens part 130 and may movably accommodate the second lens part 120 disposed between the first lens part 110 and the third lens part 130. The holder unit 200 may internally accommodate the actuator 300 for moving the second lens part 120.

The holder unit 200 may comprise a holder 210 and a cover 220. However, any one or more of the holder 210 and the cover 220 in the holder unit 200 may be omitted or changed. Further, the holder 210 and the cover 220 may be integrally formed. The holder unit 200 may comprise at least a portion of the lens unit 100 and a holder 210 for accommodating the actuator 300 therein. The holder unit 200 may comprise a cover 220 that downwardly presses the peripheral portion of the upper surface of the first lens 111 and is screw-coupled to the outer circumferential surface of the holder 210.

The holder 210 may accommodate at least a portion of the lens unit 100 therein. The holder 210 may accommodate the light source 420 therein. The holder 210 may be positioned above the substrate 410. The holder 210 may be positioned on the upper surface of the first heat sink 431. The holder 210 may be coupled with the heat dissipating member 430 by a coupling member. The holder 210 may be fixed to the substrate 410. The upper end of the holder 210 may be circular. The lower end of the holder 210 may be circular. The holder 210 can accommodate the actuator 300 therein. The holder 210 may comprise an actuator receiving groove having a shape corresponding to the shape of the actuator 300. The holder 210 may comprise an actuator receiving groove having a shape corresponding to the shape of the rectangular parallelepiped actuator 300. At this time, the actuator receiving groove may be formed as an actuator receiving hole. The holder 210 may comprise a lens barrel receiving hole having a corresponding shape to accommodate the third lens barrel 133, which is a cylindrical shape having the outermost shape. At this time, the lens barrel receiving hole may be formed as a lens barrel receiving groove. The holder 210 may accommodate the actuator 300 having the rectangular parallelepiped shape by accommodating the lens unit 100 whose outermost barrel is cylindrical. The holder 210 may have a circular shape at the lower end and the upper end. The cross-section of the intermediate portion of the holder 210 may have a rectangular-shaped groove.

The cover 220 can downwardly press the peripheral portion of the upper surface of the first lens 111. The cover 220 may be screw-coupled to the outer circumferential surface of the holder 210. The cover 220 may be coupled to the upper portion of the holder 210. The holder 210 can accommodate the first lens part 110 therein. The cover 220 may comprise a hollow hole that exposes a portion of the upper surface of the first lens 111. The cover 220 may be formed in a way that the lower side thereof is open. The side surface of the cover 220 can be coupled to the side surface of the holder 210. A space may be formed inside by the engagement of the cover 220 and the holder 210. The lens unit 100 and the actuator 300 can be accommodated in the inner space formed by the cover 220 and the holder 210.

The actuator 300 may be referred to as a 'voice coil motor (VCM)'. The actuator 300 can move the lens unit 100 coupled to the actuator 300 through electromagnetic interaction.

The actuator 300 can move the second lens part 120. The actuator 300 can move the second lens part 120 along the direction perpendicular to the optical axis of the lens unit 100. At this time, the movement of the second lens part 120 along the direction of the optical axis can be restricted. Here, the 'optical axis' may be referred to as 'vertical direction', 'vertical direction' and 'Z axis direction'. In addition, the 'direction perpendicular to the optical axis' may be referred to as 'front/back, left/right direction', 'horizontal direction' and 'X axis/Y axis direction'. The actuator 300 can move the second lens part 120 along the first axis direction and the second axis direction. At this time, the first axis direction and the second axis direction may meet with slope. Further, the first axis direction and the second axis direction may be orthogonal. In this case, the first axis may be referred to as an 'X axis' and the second axis may be referred to as a 'Y axis'. That is, the actuator 300 can move the second lens part 120 along at least any one of the X axis direction and the Y axis direction.

The actuator 300 may comprise a first axis driving unit 310 and a second axis driving unit 320. However, any one or more of the first axis driving unit 310 and the second axis driving unit 320 in the actuator 300 may be omitted or changed.

The actuator 300 may comprise a first axis driving unit 310 for moving the second lens part 120 along the first axis direction. The actuator 300 may comprise a second axis driving unit 320 for moving at least a portion of the second lens part 120 and the first axis driving unit 310 together along a second axis direction which is different from the first axis direction.

The first axis driving unit 310 can move the second lens part 120 along the first axis direction. The first axis driving unit 310 can move the second lens part 120 along the X axis direction. In this case, the first axis driving unit 310 may be referred to as an 'X axis driving unit'.

The first axis driving unit 310 may comprise a first housing 311a, a second housing 312a, a first magnet 313, a first coil 314, a first guide portion 315, and a first sensor 316. However, at least any one among the first housing 311a, the second housing 312a, the first magnet 313, the first coil 314, the first guide portion 315, and the first sensor 316 in the first axis driving unit 310 may be omitted or changed. The first axis driving unit 310 may comprise a first housing 311a to which the second lens part 120 is coupled. The first axis driving unit 310 may comprise a second housing 312a that is spaced apart from the first housing 311a. The first axis driving unit 310 may comprise a first magnet 313 positioned in the first housing 311a. The first axis driving unit 310 may comprise a first coil 314 positioned in the second housing 312a and facing the first magnet 313. The first axis driving unit 310 may comprise a first guide unit 315 for guiding the movement of the first housing 311a.

The first housing 311a may be coupled to the second lens part 120. The first housing 311a may be spaced apart from the second housing 312a. The first guide portion 315 may be positioned between the first housing 311a and the second housing 312a. In this case, the movement of the first housing 311a may be guided by the first guide portion 315. The first magnet 313 may be positioned in the first housing 311a.

A portion of the outer circumferential surface of the first housing 311a may be spaced apart from the second housing 312a. The first housing 311a may be spaced apart from the second housing 312a in the first axis direction. The first housing 311a may be in surface contact with the second housing 312a in the second axis direction. With this structure, the first housing 311a can move along the first axis direction while the second housing 312a is fixed. In addition, when the second housing 312a moves along the second axis direction, the first housing 311a can move integrally with the second housing 312a.

The second housing 312a may be spaced apart from the first housing 311a. The second housing 312a may be spaced apart from the third housing 321a. The second guide portion may be positioned between the second housing 312a and the third housing 321a. In this case, the movement of the second housing 312a may be guided by the second guide portion. A first coil 314 may be positioned in the second housing 312a. However, the first coil 314 may be positioned in the first housing 311a, and the first magnet 313 may be positioned in the second housing 312a.

The first magnet 313 may be positioned in the first housing 311a. The first magnet 313 may be disposed on the outer circumferential surface of the first housing 311a. The first magnet 313 may be disposed on one side of the first housing 311a. A plurality of first magnets 313 may be disposed around the side surface of the first housing 311a. The first magnet 313 may face the first coil 314. In this case, when power is supplied to the first coil 314, the first magnet 313 may move by electromagnetic interaction. At this time, the first housing 311a to which the first magnet 313 is fixed can move integrally with the first magnet 313. The first housing 311a can move along the first axis direction by the electromagnetic interaction between the first magnet 313 and the first coil 314. The first housing 311a can move along the X axis direction by electromagnetic interaction between the first magnet 313 and the first coil 314. At this time, the second lens part 120 can move integrally with the first housing 311a.

The first coil 314 may be positioned in the second housing 312a. The first coil 314 may be disposed on the inner circumferential surface of the second housing 312a. The first coil 314 may be disposed on one side of the second housing 312a. A plurality of first coils 314 may be disposed around the plurality of side surfaces of the second housing 312a. The first coil 314 may be facing to the first magnet 313. In this case, when power is supplied to the first coil 314, the first coil 314 can move the first magnet 313 through electromagnetic interaction.

The first guide portion 315 may be positioned between the first housing 311a and the second housing 312a. The first guide portion 315 can guide the movement of the first housing 311a. The first guide portion 315 may comprise a guide ball. At this time, the guide ball may be a ceramic ball. A plurality of guide balls may be provided. In this case, the plurality of guide balls may be disposed spaced apart from each other. The first guide portion 315 may guide the movement of the first housing 311a along the first axis direction. The first guide portion 315 can guide movement of the first housing 311a along the X axis direction.

The first sensor 316 may sense the position and/or movement of the first housing 311a. The first sensor 316 may be used for feedback of movement to the first housing 311a. The first sensor 316 may be positioned in the second housing 312a. The first sensor 316 can sense the magnetic field of the first magnet 313. The first sensor 316 can sense the position of the first housing 311a to which the first magnet 313 is fixed by sensing the magnetic field of the first magnet 313. The first sensor 316 may be a Hall sensor. However, it is not limited thereto. The first sensor 316 may face the first magnet 313. The first sensor 316 may be positioned between the first coils 314. As an alternative, the first sensor 316 can sense a sensing magnet (not shown) disposed separately from the first magnet 313.

The second axis driving unit 320 can move the second lens part 120 along the second axis direction. The second axis driving unit 320 can move at least a portion of the first axis driving unit 310 along the second axis direction. The second axis driving unit 320 can move at least a portion of the second lens part 120 and the first axis driving unit 310 integrally. The second axis driving unit 320 can move the second lens part 120 and the first axis driving unit 310 integrally as a whole. The second axis driving unit 320 may be referred to as a 'Y axis driving unit'.

The second axis driving unit 320 may comprise a third housing 321a, a second magnet 323, a second coil 324, a second guide unit, and a second sensor 326. However, in the second axis driving unit 320, at least any one of the third housing 321a, the second magnet 323, the second coil 324, the second guide portion, and the second sensor 326 may be omitted or changed. On the other hand, the second housing 312a may also be understood as one component of the second axis driving unit 320. The second axis driving unit 320 may comprise a third housing 321a spaced apart from the second housing 312a, a second magnet 323 positioned in the second housing 312a, a second coil 324 opposing the second magnet 323, and a second guide portion guiding movement of the second housing 312a.

The third housing 321a may be spaced apart from the second housing 312a. The second coil 324 may be positioned in the third housing 321a. The third housing 321a may be fixed to the holder 210. The third housing 321a may be coupled to the holder unit 200. The second guide portion may be positioned between the third housing 321a and the second housing 312a. In this case, the movement of the second housing 312a may be guided by the second guide portion. Alternatively, a fourth housing separate from the third housing 321a may be provided. In this case, any one of the second magnet 323 and the second coil 324 may be positioned in the third housing 321a and the remaining one may be positioned in the fourth housing.

The second magnet 323 may be positioned in the second housing 312a. The second magnet 323 may be disposed on the outer circumferential surface of the second housing 312a. The second magnet 323 may be disposed on one side of the second housing 312a. A plurality of second magnets 323 may be provided and disposed on the plurality of side surfaces of the second housing 312a. The second magnet 323 may face the second coil 324. In this case, when power is supplied to the second coil 324, the second magnet 323 can move by electromagnetic interaction. At this time, the second housing 312a, to which the second magnet 323 is fixed, can move integrally with the second magnet 323. The second housing 312a can move along the second axis direction by the electromagnetic interaction between the second magnet 323 and the second coil 324. The second housing 312a can move along the Y axis direction by the electromagnetic interaction between the second magnet 323 and the second coil 324. At this time, the second lens part 120 and the first housing 311a can move integrally with the second housing 312a.

The second coil 324 may be positioned in the third housing 321a. The second coil 324 may be disposed on the inner circumferential surface of the third housing 321a. The second coil 324 may be disposed on a side surface of one side of the third housing 321a. A plurality of second coils 324 may be provided around the plurality of side surfaces of the third housing 321a. The second coil 324 may be opposed to the second magnet 323. In this case, when power is supplied to the second coil 324, the second coil 324 can move the second magnet 323 through the electromagnetic interaction. Meanwhile, the second coil 324 may be positioned in the second housing 312a, and the second magnet 323 may be positioned in the third housing 321a.

The second guide portion may be positioned between the second housing 312a and the third housing 321a. The second guide portion can guide the movement of the second housing 312a. The second guide portion may have a shape corresponding to the first guide portion. The second guide portion may comprise a guide ball. At this time, the guide ball may be a ceramic ball. A plurality of guide balls may be provided. In this case, the plurality of guide balls may be disposed spaced apart from each other. The second guide portion can guide movement of the second housing 312a along the second axis direction. The second guide portion can guide movement of the second housing 312a along the Y axis direction.

The second sensor 326 can sense the position and/or movement of the second housing 312a. The second sensor 326 can be used for feedback of movement with respect to the second housing 312a. The second sensor 326 may be positioned in the third housing 321a. The second sensor 326 can sense the magnetic field of the second magnet 323. The second sensor 326 can sense the position of the second housing 312a to which the second magnet 323 is fixed by sensing the magnetic field of the second magnet 323. The second sensor 326 may be a Hall sensor. However, it is not limited thereto. The second sensor 326 may be opposed to the second magnet 323. The second sensor 326 may be positioned between the second coils 324. Alternatively, the second sensor 326 can sense a sensing magnet (not shown) disposed separately from the second magnet 323.

Hereinafter, a method of manufacturing the light output module according to the first exemplary embodiment of the present invention will be described with reference to the drawings.

Figure 6:
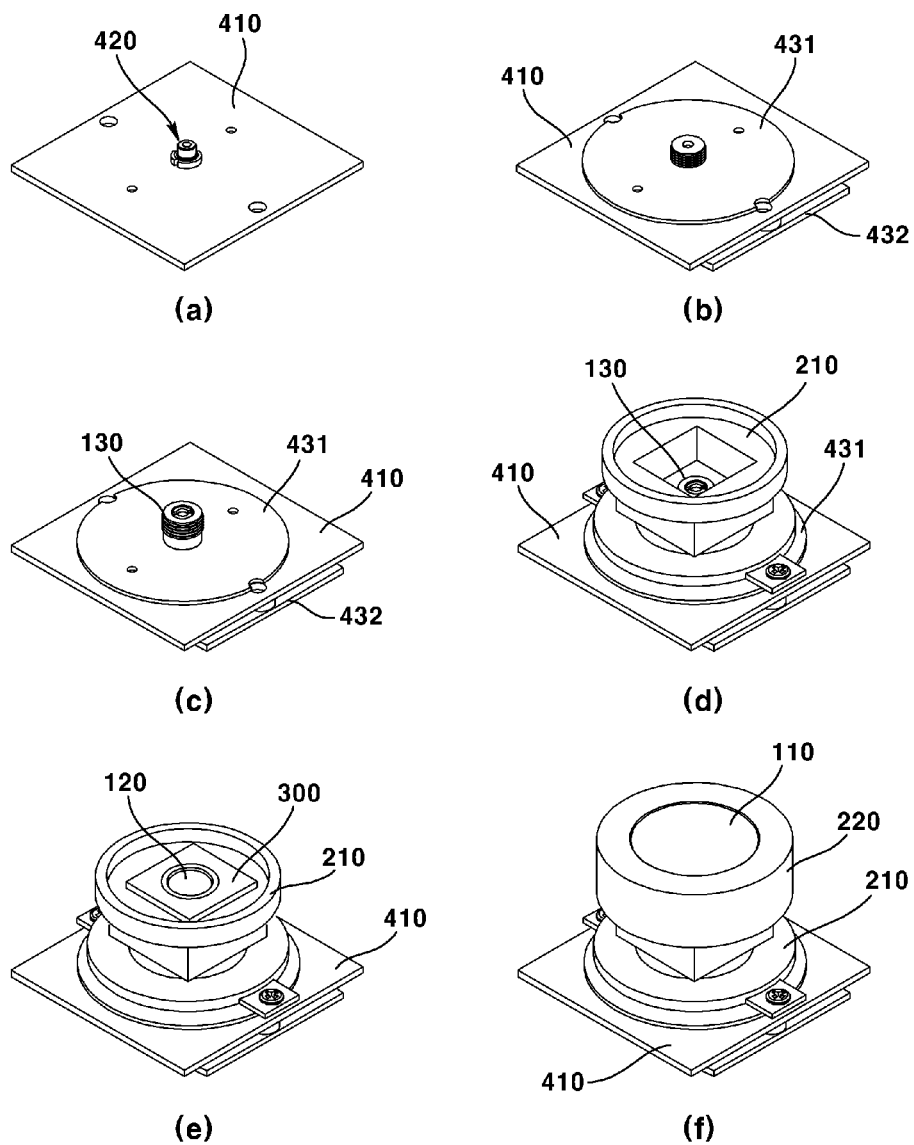
FIG. 6 is a perspective view of the light output module according to the first exemplary embodiment of the present invention, illustrating the steps (a) to (f) along the manufacturing process.

FIG. 6 is a perspective view of the light output module according to the first exemplary embodiment of the present invention, illustrating the steps (a) to (f) along the manufacturing process.

First, a substrate 410 on which a light source 420 is mounted is prepared as shown in FIG. 6(a). Later, a first heat sink 431 is disposed on the upper surface of the substrate 410, and a second heat sink 432 is disposed on the lower side of the substrate 410 as shown in FIG. 6(b). Later, the third lens part 130 is coupled to the protrusion which is a portion that accommodates the light source 420 in the first heat sink 431 as shown in FIG. 6(c). At this time, a thread may be formed on the outer circumferential surface of the protrusion and a part of the inner circumferential surface of the third lens barrel 133 so as to be screw-coupled. Later, as shown in FIG. 6(d), the holder 210 is coupled to the upper surface of the first heat sink 431 so as to accommodate the third lens part 130 therein. At this time, the holder 210 may be coupled to the second heat sink 432 by a coupling member. Later, the actuator 300 coupled with the second lens part 120 is accommodated in the holder 210 as shown in FIG. 6(e). Then, as shown in FIG. 6(f), the first lens part 110 and the cover 220 are coupled to complete the manufacture of the light output module according to the present exemplary embodiment. At this time, the inner circumferential surface of the cover 220 and the outer circumferential surface of the holder 210 may be threaded and screw-coupled together.

Hereinafter, the operation of the light output module according to the first embodiment of the present invention will be described with reference to the drawings.

Figure 7:
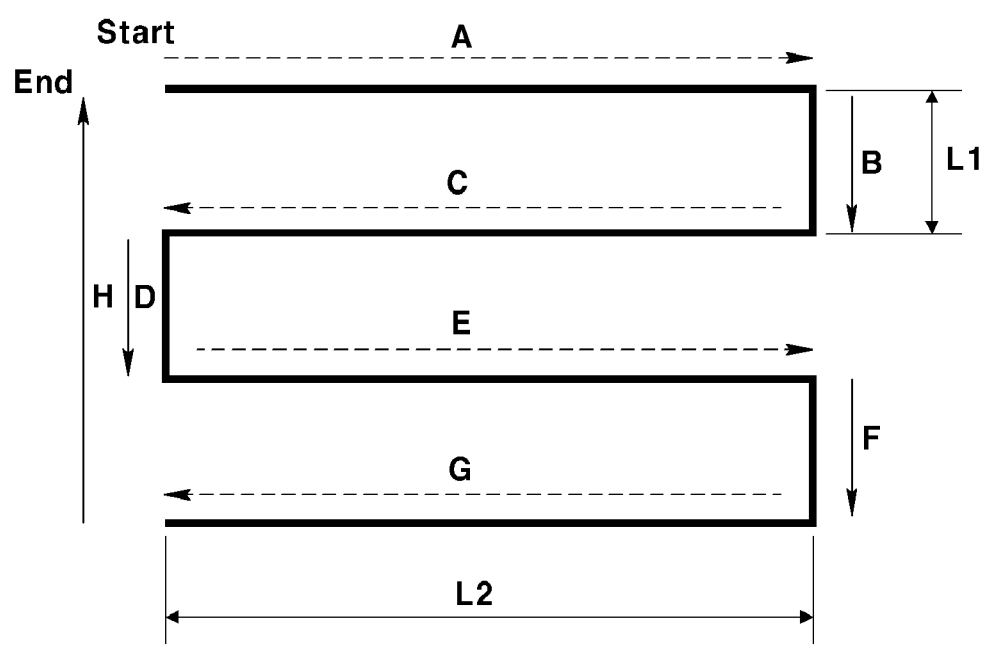
FIG. 7 is a reference diagram for explaining the operation of a light output module according to the first exemplary embodiment of the present invention.

FIG. 7 is a reference diagram for explaining the operation of a light output module according to the first exemplary embodiment of the present invention.

In the present exemplary embodiment, the first lens part 110, the third lens part 130, and the light source 420 are fixed to the substrate 410. However, the second lens part 120 can move along the X axis direction and the Y axis direction with respect to the substrate 410. Here, the movement of the second lens part 120 is limited to the X axis and Y axis, however, according to the exemplary embodiment, the second lens part 120 can move along three or more axis directions.

The light output module according to the present exemplary embodiment can illuminate light onto the point indicated by "Start" in FIG. 7. Then, the first axis driving unit 310 moves the second lens part 120 by a second distance L2 along a first direction parallel to the X axis (see A in FIG. 7). More specifically, when power is supplied to the first coil 314 positioned in the second housing 312a, the first magnet 313 positioned in the first housing 311a electromagnetically interacts with the first coil 314 so that the second lens part 120, the first housing 311a, and the first magnet 313 move integrally along the first direction. At this time, the second housing 312a maintains a fixed state thereof.

Then, the second axis driving unit 320 moves the second lens part 120 by a first distance L1 along a second direction parallel to the Y axis direction (B). More specifically, when power is supplied to the second coil 324 positioned in the third housing 321a, the second magnet 323 positioned in the second housing 312a electromagnetically interacts with the second coil 324 so that the second lens part 120, the first housing 311a, the second housing 312a, and the second magnet 323 move integrally along the second direction.

Then, the first axis driving unit 310 moves the second lens part 120 by a second distance L2 along a third direction opposite to the first direction (C). In this case also, when power is supplied to the first coil 314, the second lens part 120, the first housing 311a, and the first magnet 313 are integrally moved while the second housing 312a is being fixed.

Then, the second axis driving unit 320 moves the second lens part 120 by the first distance L1 along the second direction (D). In this case also, when power is supplied to the second coil 324, the second lens part 120, the first housing 311a, the second housing 312a, and the second magnet 323 are integrally moved along the second direction.

Then, as described above, the first axis driving unit 310 and the second axis driving unit 320 alternately operate to move the second lens part 120 (see E, F, and G in FIG. 7).

Then, the second axis driving unit 320 is moved by three times the first distance L1 in the fourth direction opposite to the second direction (H). Thus, the second lens part 120 arrives at a position indicated by End/Start and completes one cycle. At this time, the driving cycle of the second lens part 120 may be performed at a cycle of 20 Hz. On the other hand, the first distance L1 shown in FIG. 7 may be 30 µm. That is, the Y axis displacement amount of the light output module according to the present exemplary embodiment may be 90 µm. Also, the second distance L2 may be 3 mm. That is, the X axis displacement amount of the light output module according to the present exemplary embodiment may be 3 mm.

Hereinafter, a configuration of a light output module according to a second exemplary embodiment of the present invention will be described with reference to the drawings. Hereinafter, the first housing 311, the second housing 321, and the third housing 312 will be described. However, the first, second, and third used in this case are merely for distinguishing the components from other components, and thus the nature, order, sequence, and the like of the corresponding components are not limited by those terms.

Figure 8:
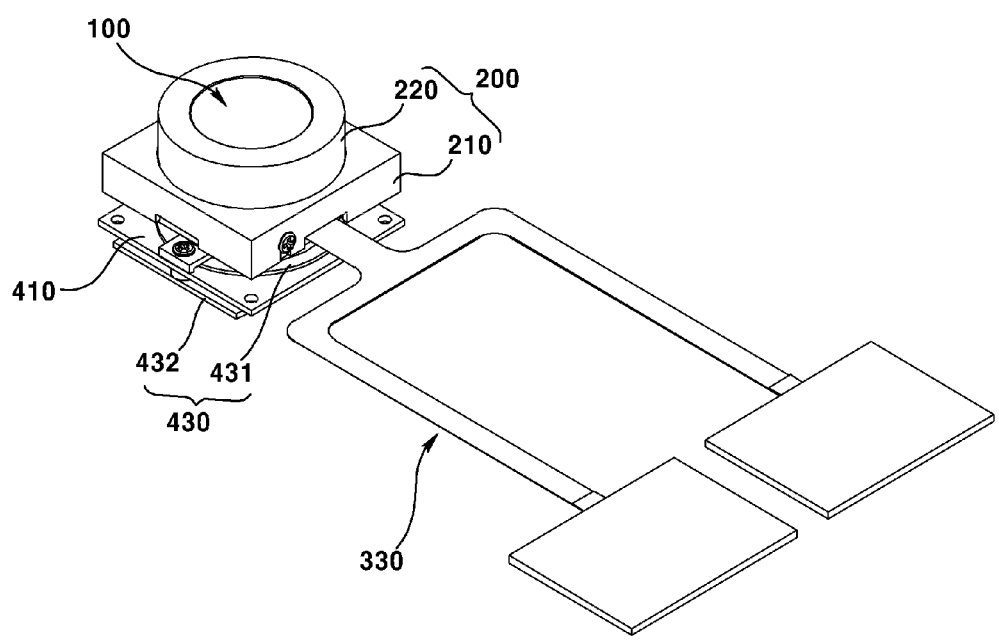
FIG. 8 is a perspective view illustrating a light output module according to the second exemplary embodiment of the present invention.
Figure 9:
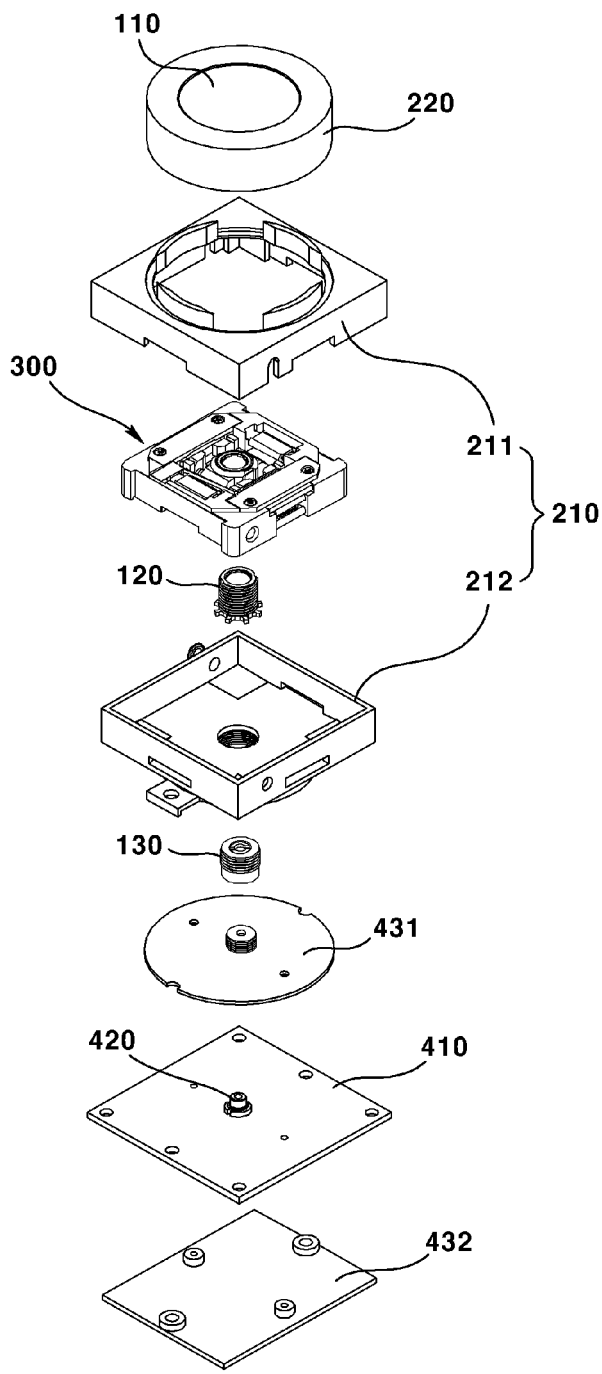
FIG. 9 is an exploded perspective view illustrating a light output module according to the second exemplary embodiment of the present invention.
Figure 10:
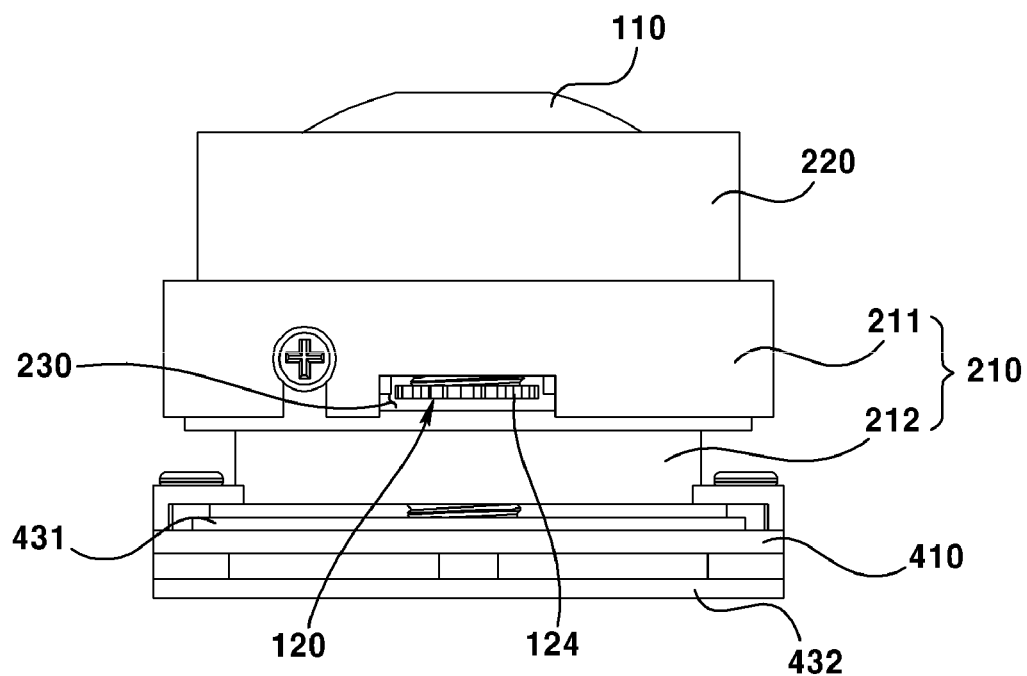
FIG. 10 is a side view illustrating a light output module according to the second exemplary embodiment of the present invention.
Figure 11:
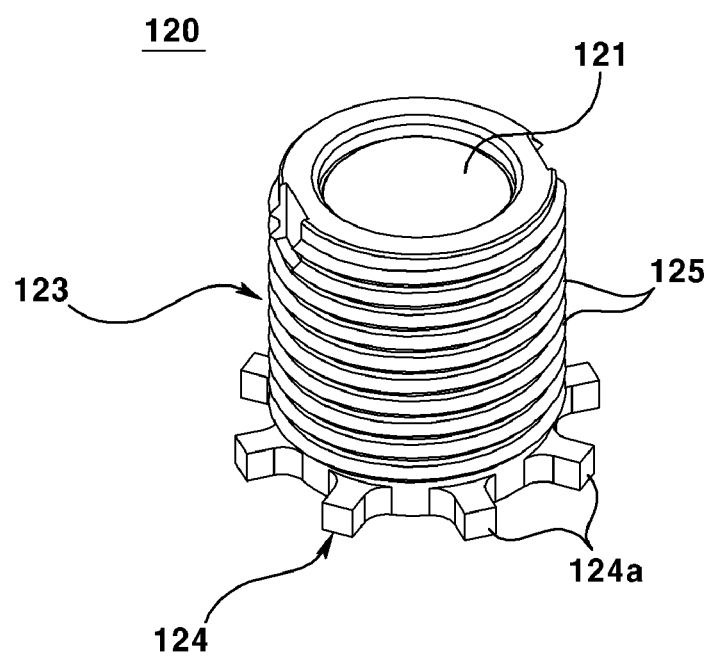
FIG. 11 is a perspective view illustrating the second lens part of the second exemplary embodiment of the present invention.
Figure 12:
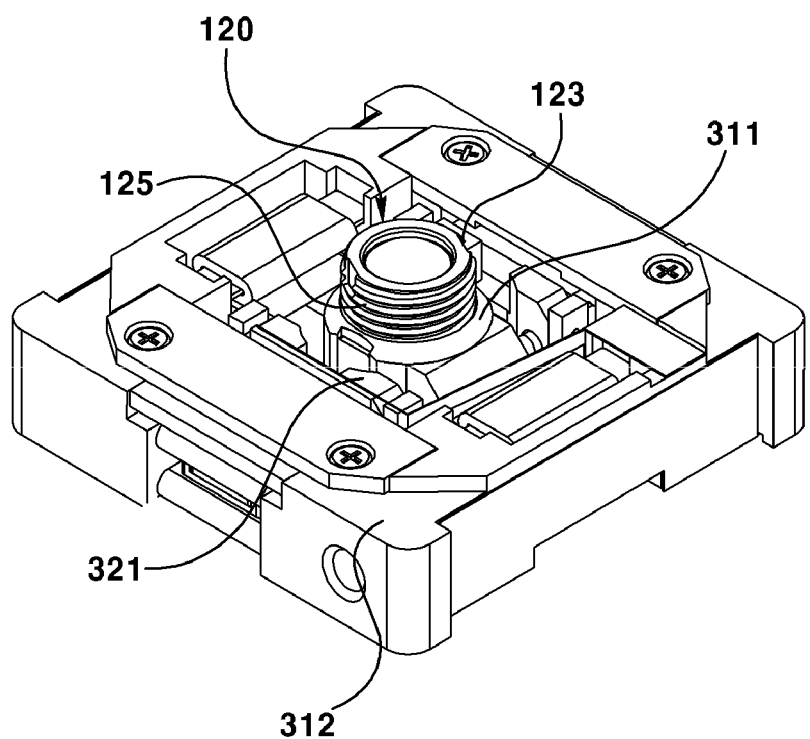
FIG. 12 is a perspective view illustrating the coupled state so that the upper portion of the second lens part is more upwardly protruded than the upper end of the first housing according to the second exemplary embodiment of the present invention.
Figure 13:
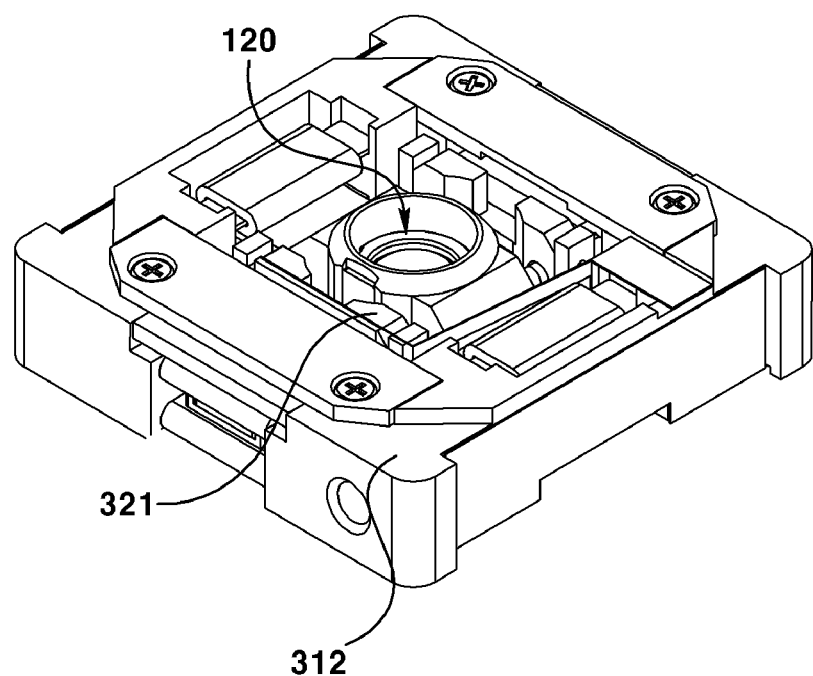
FIG. 13 is a perspective view illustrating the coupled state so that the second lens part is disposed lower than the upper end of the first housing according to the second exemplary embodiment of the present invention.
Figure 14:
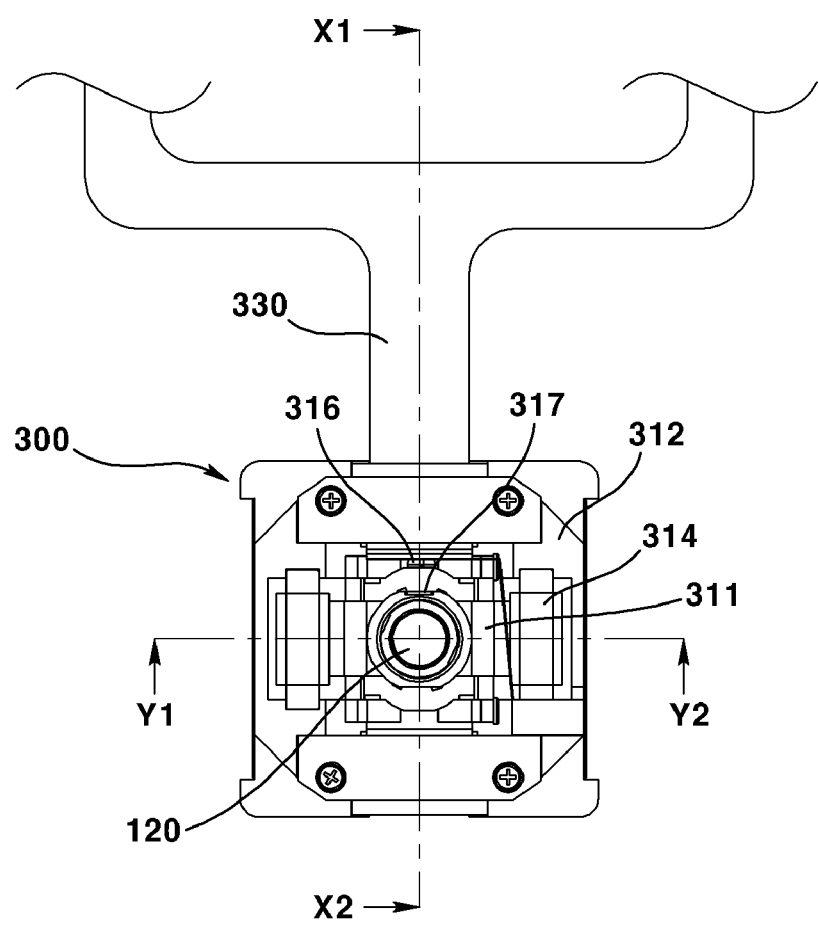
FIG. 14 is a plan view illustrating a light output module according to the second exemplary embodiment of the present invention.
Figure 15:
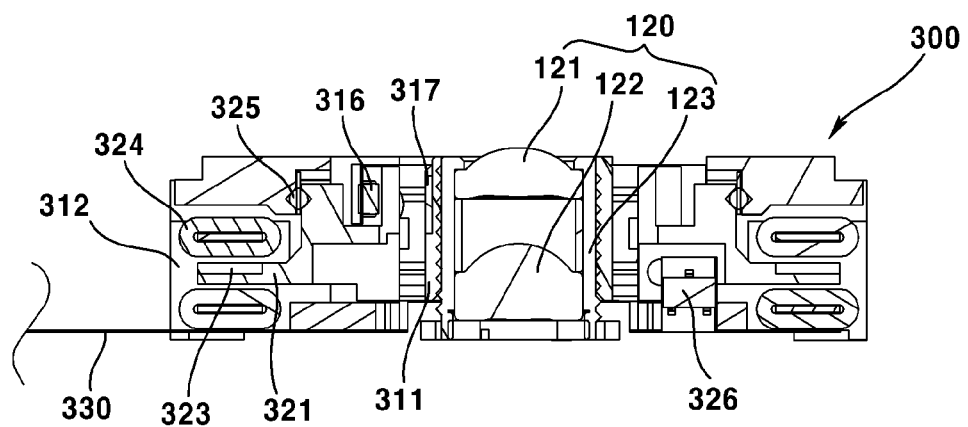
FIG. 15 is a cross-sectional view, viewing from the line X1-X2 in FIG. 10.
Figure 16:
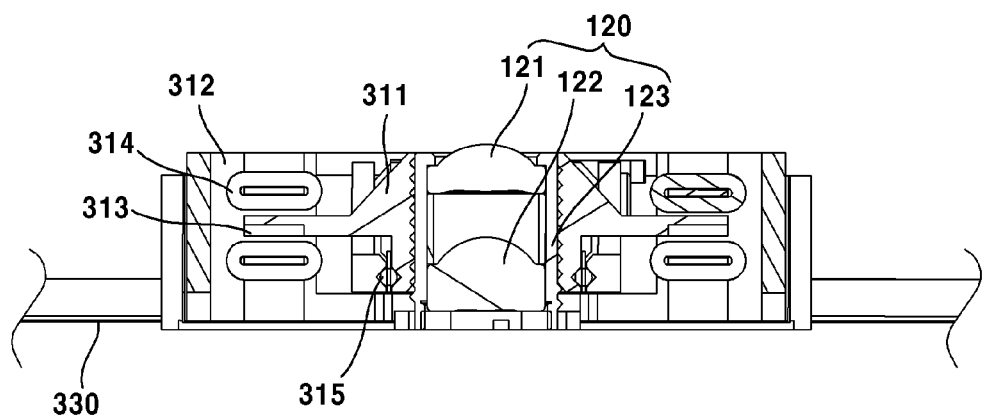
FIG. 16 is a cross-sectional view, viewing from the line Y1-Y2 in FIG. 10.
Figure 17:
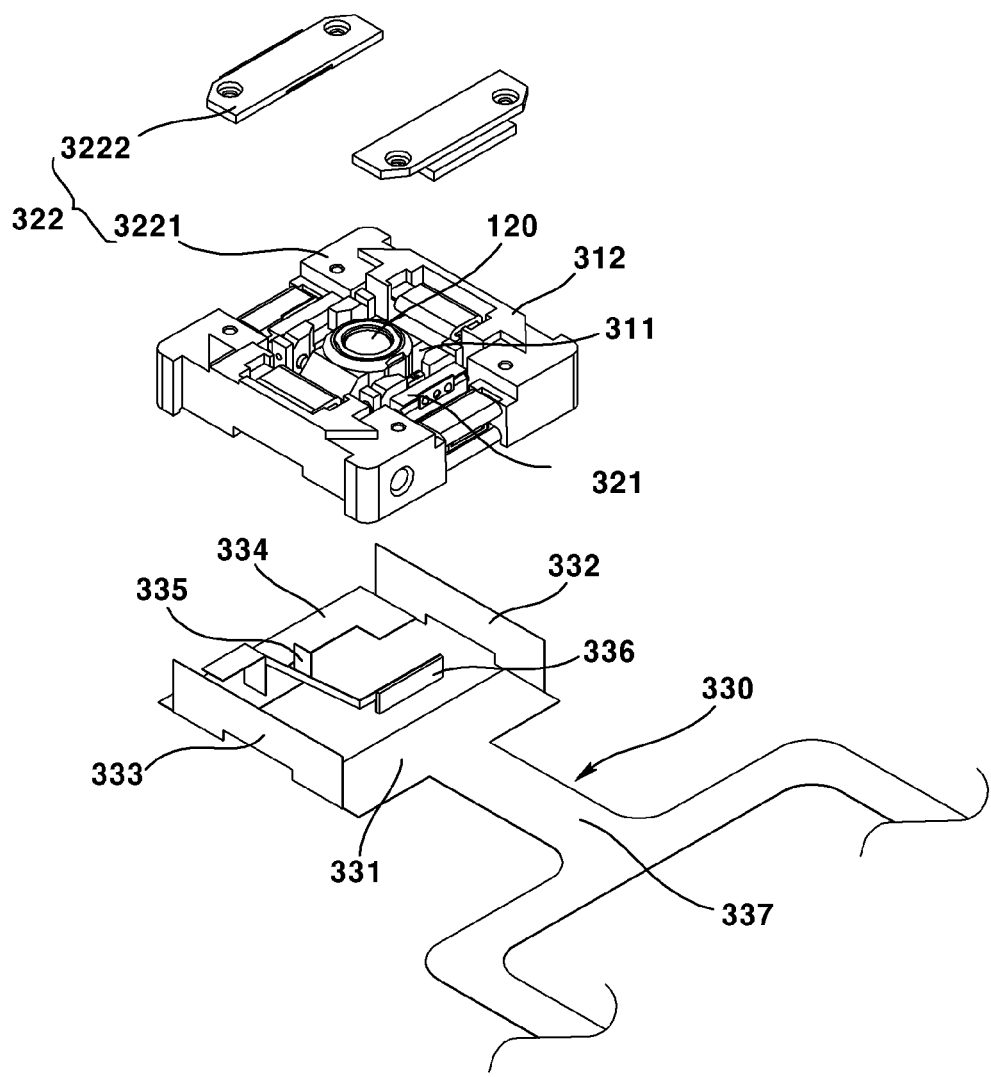
FIG. 17 is an exploded perspective view illustrating an actuator of a light output module according to the second exemplary embodiment of the present invention.
Figure 18:
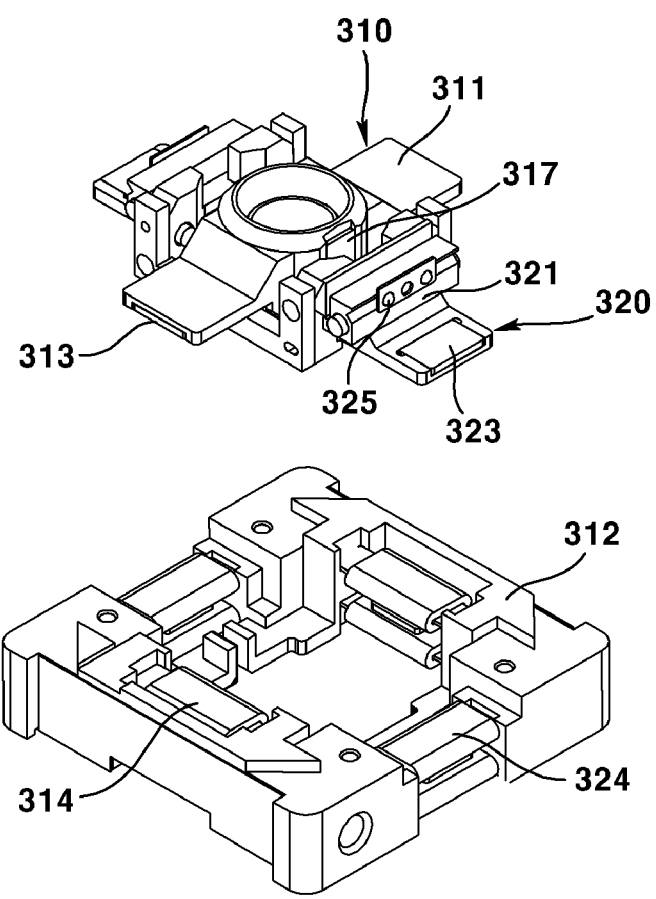
FIG. 18 is partially cutaway exploded perspective view illustrating an actuator of a light output module according to the second exemplary embodiment of the present invention.
Figure 19:
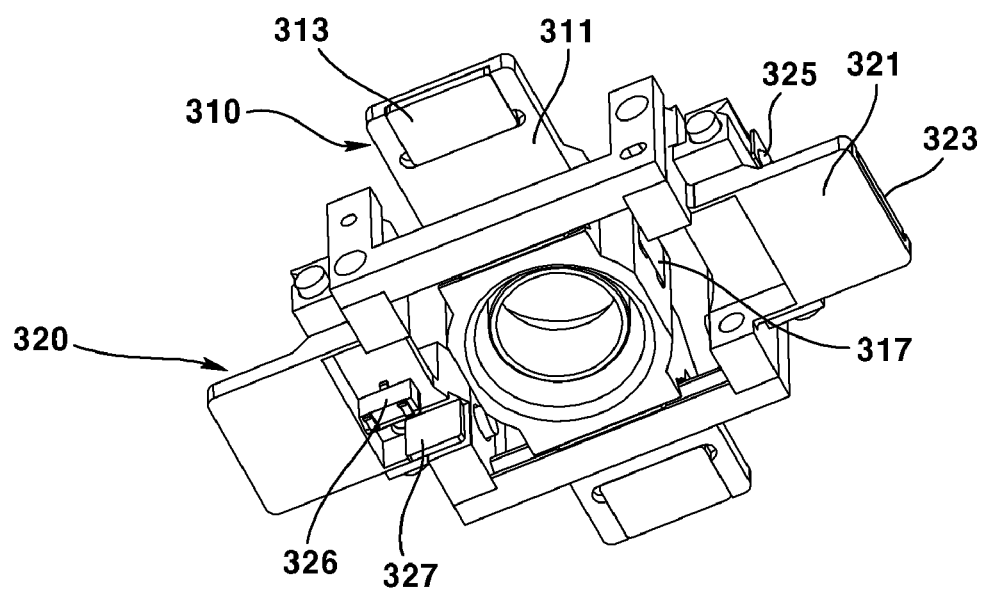
FIG. 19 is partially cutaway bottom perspective view illustrating an actuator of a light output module according to the second exemplary embodiment of the present invention.
Figure 20:
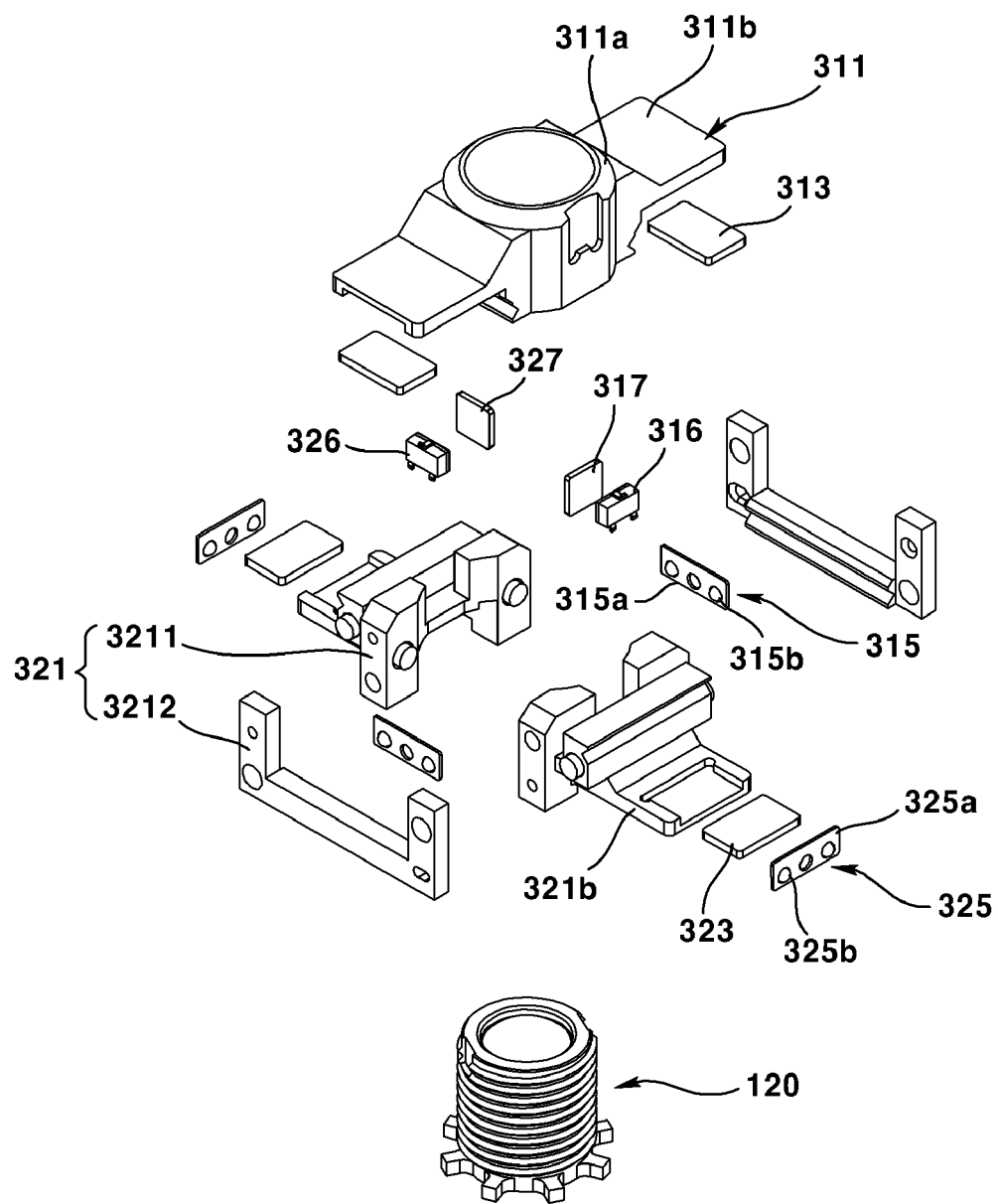
FIGS. 20 to 21 are partially cutaway exploded perspective views illustrating actuators of the light output modules according to the second exemplary embodiment of the present invention.
Figure 21:
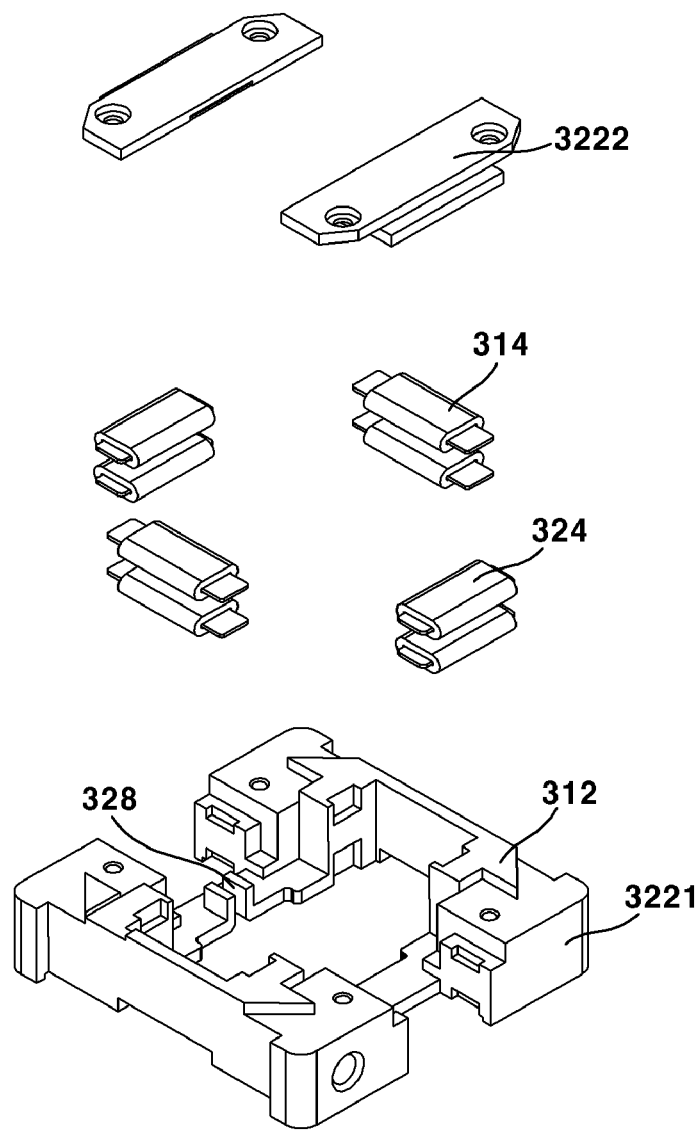

FIG. 8 is a perspective view illustrating a light output module according to the second exemplary embodiment of the present invention; FIG. 9 is an exploded perspective view illustrating a light output module according to the second exemplary embodiment of the present invention; FIG. 10 is a side view illustrating a light output module according to the second exemplary embodiment of the present invention; FIG. 11 is a perspective view illustrating the second lens part of the second exemplary embodiment of the present invention; FIG. 12 is a perspective view illustrating the coupled state so that the upper portion of the second lens part is more upwardly protruded than the upper end of the first housing according to the second exemplary embodiment of the present invention; FIG. 13 is a perspective view illustrating the coupled state so that the second lens part is disposed lower than the upper end of the first housing according to the second exemplary embodiment of the present invention; FIG. 14 is a plan view illustrating a light output module according to the second exemplary embodiment of the present invention; FIG. 15 is a cross-sectional view, viewing from the line X1-X2 in FIG. 10; FIG. 16 is a cross-sectional view, viewing from the line Y1-Y2 in FIG. 10; FIG. 17 is an exploded perspective view illustrating an actuator of a light output module according to the second exemplary embodiment of the present invention; FIG. 18 is partially cutaway exploded perspective view illustrating an actuator of a light output module according to the second exemplary embodiment of the present invention; FIG. 19 is partially cutaway bottom perspective view illustrating an actuator of a light output module according to the second exemplary embodiment of the present invention; and FIGS. 20 to 21 are partially cutaway exploded perspective views illustrating actuators of the light output modules according to the second exemplary embodiment of the present invention.

The light output module according to the second exemplary embodiment of the present invention may comprise a substrate 410, a light source 420, a radiation member 430, and a lens driving device. However, in the light output module according to the present exemplary embodiment, at least any one of the substrate 410, the light source 420, the heat radiation member 430, and the lens driving device may be omitted or changed. Especially, the heat dissipating member 430, a member for radiating heat generated in the light source 420, may be omitted or replaced with another member.

As for the description of the substrate 410, the light source 420, and the heat dissipation member 430 in the light output module according to the second exemplary embodiment of the present invention, the description of the substrate 410, the light source 420, and the heat dissipation member 430 according to the first exemplary embodiment may be applied analogously.

As for the description of the lens driving device according to the second exemplary embodiment of the present invention, the description of the lens driving device according to the first exemplary embodiment may be applied analogously. Therefore, hereinafter, the lens driving device according to the second exemplary embodiment will be described focusing on the differences from the first exemplary embodiment.

The lens driving device according to the second embodiment of the present invention may comprise a lens unit 100, a holder unit 200, and an actuator 300. However, at least any one of the lens unit 100, the holder unit 200, and the actuator 300 in the lens driving device according to the second embodiment of the present invention may be omitted.

The second lens part 120 may be disposed movably within the holder unit 200. The second lens part 120 may be disposed on the lower side of the first lens part 110 so as to be movable within the holder unit 200.

The second lens part 120 may comprise a grip portion 124 formed on the second lens barrel 123. The grip portion 124 may be externally exposed towards the horizontal direction through the through hole 230. The grip portion 124 may be protruded along the radial direction from the outer circumferential surface of the second lens barrel 123. The grip portion 124 may be formed at the lower end of the second lens barrel 123. The grip portion 124 may comprise a plurality of protrusions 124a that are spaced apart from each other. Each of the projections 124a, at least a portion thereof, may be getting narrower as it travels towards the outer side from the outer circumferential surface of the second lens barrel 123. The length along the wider axis of the protrusion may be shorter than the length along the wider axis of the through hole. Accordingly, even if the projection 124a moves along the wider axis direction, the projection 124a can be externally exposed along the horizontal direction through the through hole 230. The plurality of protrusions comprises eight protrusions 124a, and the eight protrusions 124a may be disposed equally spaced apart on the outer circumferential surface of the second lens barrel 123. When the second lens barrel 123 is rotated by the distance between the adjacent protrusions among the eight protrusions 124a, the second lens part 120 may be moved by 30 and 50 μm along the optical axis. In other words, when the second lens barrel 123 rotates by 45° (=360°/8), the second lens part 120 can move by 30 to 50° along the optical axis direction. At this time, the second lens part 120 can move by 40 μm along the optical axis direction. The active alignment of the second lens barrel 123 may be adjusted by the shape of the protrusion at the lower end of the threaded barrel. By one adjustment of the protruded portion, 40 μm adjustment can be accomplished.

The protrusion 124a of the grip portion 124 of the second lens barrel 123 is rotated through the through hole 230 of the holder unit 200 so that the alignment of the second lens part 120 can be adjusted with the second lens barrel 123 coupled to the first housing 311. For example, the protrusion 124a of the grip portion 124 is rotated from the outside via the through-hole 230, thereby positioning the second lens barrel 123 in a way that the upper end of the second lens barrel 123 is more protruded than the upper end of the first housing 311 as shown in FIG. 12. At this time, the projection 124a may already rotated clockwise. Or, the projection 124a may already rotated counterclockwise. Also, the projection 124a of the grip portion 124 may be rotated from the outside via the through hole 230, thereby positioning the second lens barrel 123 in a way that the upper end of the second lens barrel 123 is positioned below the upper end of the first housing 311 as shown in FIG. 13. At this time, the projection 124a may already rotated clockwise or counterclockwise, but it may be the opposite direction than the direction along which the second lens barrel 123 is rotated to raise it.

The second lens part 120 may comprise a first screw thread 125 formed on the outer circumferential surface of the second lens barrel 123. The first screw thread 125 may be formed on the outer circumferential surface of the second lens barrel 123. A second screw thread may be formed on the inner circumferential surface of the first housing 311. The second screw thread may be formed on the inner circumferential surface of the first housing 311. The first screw thread 125 may correspond to a second screw thread formed on the inner circumferential surface of the first housing 311. That is, the first screw thread 125 of the second lens barrel 123 may be screw-coupled into the second screw thread of the first housing 311. In other words, the second lens barrel 123 can move upward or downward with respect to the first housing 311 when rotated. In the present exemplary embodiment, since the upper side and the lower side are parallel to the optical axis, active alignment can be performed only by rotating the second lens barrel 123 in the present exemplary embodiment. The first screw thread 125 may be micro-machined on the outer periphery of the second lens barrel 123. The pitch of the first screw thread 125 may be 0.2 to 0.4 mm. The pitch of the first screw thread 125 may be 0.3 mm as an example. The pitch of the first screw thread 125 may be adjusted.

The holder 210 may comprise an upper holder part 211 and a lower holder part 212. However, at least any one of the upper holder part 211 and the lower holder part 212 in the holder 210 may be omitted or changed. Further, the upper holder part 211 and the lower holder part 212 may be integrally formed.

The upper holder part 211 may be coupled to the upper portion of the lower holder part 212. The lower side of the upper holder part 211 may be open. The upper holder part 211 may comprise a protruded portion protruding upward to engage with the cover 220. The upper holder part 211 may comprise an opening through which the lens unit 100 passes. The side surface of the upper holder part 211 may be engaged with the side surface of the lower holder part 212. The side surface of the upper holder part 211 may be coupled to the outer side of the side surface of the lower holder part 212. The upper holder part 211 and the lower holder part 212 may be coupled to each other by a separate coupling member. At this time, the coupling member may be a bolt or a screw.

The lower holder part 212 may be coupled to the lower portion of the upper holder part 211. The upper side of the lower holder part 212 may be open. The lower holder part 212 can be screw-coupled to the first heat sink 431. The lower holder part 212 may be coupled to the second heat sink 432 through a coupling member. The lens unit 100 and the actuator 300 can be accommodated in the inner space formed by the upper holder part 211 and the lower holder part 212.

A through hole 230 may be formed in the side surface of the holder unit 200. The through hole 230 may be formed through the side surface of the holder unit 200. The grip portion 124 formed on the second lens barrel 123 may be outwardly exposed via the through hole 230 along the horizontal direction. In this case, the worker may perform active alignment of the second lens part 120 by rotating the grip portion 124 via the through hole 230 during the manufacturing process. More specifically, when the worker pushes the protrusion 124a of the grip portion 124 via the through hole 230 with a member such as a rod to rotate the second lens barrel 123, the second lens barrel 123 may move upward or downward with respect to the screw-coupled first housing 311 so that the active alignment may be accomplished. The length of the through hole 230 along the wider axis thereof may be longer than the length of the projection 124a along the wider axis thereof. The through hole 230 may have a rectangular shape when viewed from the horizontal direction. However, it is not limited thereto.

The actuator 300 may comprise a first axis driving unit 310, a second axis driving unit 320, and a substrate 330. However, any one or more of the first axis driving unit 310, the second axis driving unit 320, and the substrate 330 in the actuator 300 may be omitted or modified.

The first axis driving unit 310 may comprise a first housing 311, a third housing 312, a first magnet 313, a first coil 314, a first guide portion 315, a first sensor 316, and a first sensing magnet 317. However, at least any one or more of the first housing 311, the third housing 312, the first magnet 313, the first coil 314, the first guide portion 315, the first sensor 315, the first sensing magnet 316, and the first sensing magnet 317 of the first axis driving unit 310 may be omitted or changed.

The first housing 311 may comprise a body portion 311a coupled to the second lens part 120. The first housing 311 may comprise a wing portion 311b extending outward from the body portion 311a. The body portion 311a may be coupled with the movable lens. The second lens part 120 may be coupled to the inner circumferential surface of the body 311a. The wing portion 311b may extend outward from the body portion 311a. The first magnet 313 may be disposed on the lower surface of the wing portion 311b so as to face the lower side.

The first coil 314 may comprise two pairs of two coils. At this time, the first magnet 313 may be positioned between the coils that form a pair. The first magnet 313 may be provided in two so that each one may be positioned for each of the two pairs of coils. The first coil 314 may be electrically connected to the substrate 330. The first coil 314 may be coupled to the second coil coupling portion 332 and the third coil coupling portion 333 of the substrate 330.

The first guide portion 315 may be disposed between the first housing 311 and the third housing 312. The first guide portion 315 can guide the first housing 311 to slide with respect to the third housing 312. The first guide portion 315 may be disposed between the first housing 311 and the second housing 321. The first guide portion 315 can guide the first housing 311 to slidingly move relative to the second housing 321. The first guide portion 315 may comprise a guide plate 315a provided with a plurality of through holes. The first guide portion 315 may comprise a plurality of guide balls 315b disposed in through holes of the guide plate 315a. The first guide portion 315 may be provided in two, for one side and the other side of the first housing 311, respectively. The first guide portion 315 may comprise two guide balls 315b and a guide plate 315a for rotatably accommodating the two guide balls. Three holes having a shape corresponding to the diameter of the guide ball 315a may be formed in the guide plate 315a. The guide ball 315a may be accommodated in two of the three holes.

The sensors 316 and 326 can sense the movement of the movable lens. At this time, the movable lens may comprise the third lens 121 and the fourth lens 122 of the second lens part 120. The sensors 316 and 326 can sense the movement of the second lens part 120. The sensors 316 and 326 may comprise a first sensor 316 that senses the movement of the movable lens along a first axis direction. At this time, the 'first axis direction' may be a direction along which the movable lens and the first housing 311 move due to the interaction between the first magnet 313 and the first coil 314. The sensors 316 and 216 may comprise a second sensor 326 that senses the movement of the movable lens in a second axis direction. At this time, the 'second axis direction' may be a direction along which the movable lens, the first housing 311, and the second housing 321 move together due to the interaction between the second magnet 323 and the second coil 324.

The first sensor 316 may be disposed in the third housing 312. Alternatively, the first sensor 316 may be disposed in the second housing 321. The first sensor 316 can sense the first sensing magnet 317. For example, the first sensor 316 may be a hall sensor. The first sensor 316 can sense the magnetic force of the first sensing magnet 317. By sensing the first sensing magnet 317, the first sensor 316 can sense the position and/or the movement of the first housing 311 to which the first sensing magnet 317 is fixed. The first sensor 316 may be positioned in the second housing 321. The first sensor 316 may be disposed to face the first sensing magnet 317. The first sensor 316 may be electrically connected to the substrate 330. The first sensor 316 may be coupled to the second sensor coupling portion 336.

The first sensing magnet 317 may be disposed in the first housing 311. The first sensing magnet 317 may be fixed to the outer surface of the first housing 311. The first sensing magnet 317 may be accommodated in the sensing magnet receiving groove formed on the outer surface of the first housing 311. The first sensing magnet 317 may face the first sensor 316. The first sensing magnet 317 may be disposed so as not to affect the electromagnetic interaction between the first magnet 313 and the first coil 314. The first sensing magnet 317 may be disposed so as not to affect the electromagnetic interaction between the second magnet 323 and the second coil 324. The first sensing magnet 317 may be disposed on the further upper side than the wing portion 311b in the outer circumferential surface of the body portion 311a. The first sensing magnet 317 may be disposed on the outer circumferential surface of the body portion 311a. The first sensing magnet 317 may be disposed above the wing portion 311b. With this structure, it is possible to minimize the magnetic interference between the first sensing magnet 317 and the first magnet 313 disposed to face downward on the lower side of the wing 311b. As an alternative example, the first sensor 316 and the first sensing magnet 317 may be disposed with positions thereof switched.

The second axis driving unit 320 comprises a second housing 321, a third housing 312, a second magnet 323, a second coil 324, a second guide portion 325, a second sensor 326, a second sensing magnet 327, and a sensor receiving portion 328. However, at least any one or more of the second housing 321, the third housing 312, the second magnet 323, the second coil 324, the second guide portion 325, the second sensing magnet 327, and the sensor receiving portion 328 in the second axis driving unit 320, may be omitted or changed. The third housing 312 may be understood as a common component of the first axis driving unit 310 and the second axis driving unit 320. A third housing 312 may be provided in the first axis driving unit 310 and a fourth housing, separate from the third housing 312, may be provided in the second axis driving unit 320. At this time, the third housing 312 and the fourth housing may be integrally formed. Therefore, it may be explained that the fourth housing is omitted and the second coil 324 is disposed in the third housing 312.

The second axis driving unit 320 may comprise a second housing 321 spaced apart from the third housing 312. The second axis driving unit 320 may comprise a second magnet 323 positioned in the second housing 321. The second axis driving unit 320 may comprise a second coil 324 positioned in the third housing 312 and facing the second magnet 323. The second axis driving unit 320 may comprise a second guide portion 325 for guiding the movement of the second housing 321.

The second housing 321 may comprise a main body 3211 and a guide portion 3212. However, at least any one of the main body 3211 and the guide portion 3212 in the second housing 321 may be omitted or changed. Further, the main body 3211 and the guide portion 3212 may be integrally formed.

The main body 3211 may accommodate the first housing 311 in the inner side. The main body 3211 may be spaced apart from the first housing 311. That is, a buffer space for the first housing 311 may be provided between the main body 3211 and the first housing 311. The second magnet 323 may be positioned in the main body 3211. The main body 3211 may comprise two spaced apart components and may be integrally combined by a guide portion 3212.

The guide portion 3212 may be coupled to the main body 3211. The guide portion 3212 may comprise a rail portion through which the guide ball can be moved. The guide portion 3212 may support the first housing 311 through the first guide portion 315. That is, the first housing 311 cannot move towards the guide portion 3212. The first guide portion 315 can move along the rail portion of the guide portion 3212. That is, the movement of the first housing 311 may be guided by the guide portion 3212.

The second housing 321 may comprise a wing portion 321b. The wing portion 321b may extend outward. The second magnet 323 may be disposed on the upper surface of the wing portion 321b so as to face the upper side.

The third housing 312 may be spaced apart from the second housing 321. A second coil 324 may be positioned in the third housing 312.

The third housing 312 may comprise a main body 3221 and a cover portion 3222. At least any one of the main body 3221 and the cover portion 3222 in the third housing 312 may be omitted or modified. Further, the main body 3221 and the cover portion 3222 may be integrally formed.

The second coil 324 may be positioned on the main body 3221. The main body 3221 may be spaced apart from the second housing 321.

The cover portion 3222 may be coupled to the upper surface of the main body 3221. The cover portion 3222 may be coupled to the main body 3221 by a separate coupling member. The cover portion 3222 may comprise a rail portion along which the guide ball can be moved. The cover portion 3222 may support the second housing 321 through the second guide portion 325. That is, the second housing 321 cannot move towards the cover portion 3222. The second guide portion 325 can move along the rail portion of the cover portion 3222. That is, the movement of the second housing 321 may be guided by the cover portion 3222.

The second coil 324 may comprise two pairs of two coils. At this time, the second magnet 323 may be positioned between the coils that form a pair. The second magnet 323 may be provided in two so that each one may be positioned for each of the two pairs of coils. The second coil 324 may be electrically connected to the substrate 330. The second coil 324 may be coupled to the first coil coupling portion 331 and the fourth coil coupling portion 334 of the substrate 330.

The second guide portion 325 may be disposed between the second housing 321 and the third housing 312. The second guide portion 315 can guide the second housing 321 to slide with respect to the third housing 312. The second guide portion 325 may be provided in two, for one side and the other side of the second housing 321, respectively. The second guide portion 325 may comprise two guide balls 325b and a guide plate 325a for rotatably accommodating the two guide balls 325b. Three holes having a shape corresponding to the diameter of the guide ball 325b may be formed in the guide plate 325a. The guide ball 325b may be accommodated in two of the three holes. The second guide portion 325 may comprise a guide plate 325a comprising a plurality of through holes. The second guide portion 325 may comprise a plurality of guide balls 325b disposed in through holes of the guide plate 325a.

The second sensor 326 may be disposed in the third housing 312. The second sensor 326 can sense the second sensing magnet 327. The second sensor 326 may be a hall sensor. The second sensor 326 can sense the magnetic force of the second sensing magnet 327. By sensing the second sensing magnet 327, the second sensor 326 can detect the position and/or the movement of the second housing 321 to which the second sensing magnet 327 is fixed. The second sensor 326 may be disposed to face the second sensing magnet 327. The second sensor 326 may be electrically connected to the substrate 330. The second sensor 326 may be coupled to the first sensor coupling portion 335.

The second sensing magnet 327 may be disposed in the second housing 321. The second sensing magnet 327 may be fixed to the lower side of the second housing 321. The second sensing magnet 327 may be fixed on the inner surface of the second housing 321. The second sensing magnet 327 may face the second sensor 326. The second sensing magnet 327 may be disposed so as not to affect the electromagnetic interaction between the first magnet 313 and the first coil 314. The second sensing magnet 327 may be disposed so as not to affect the electromagnetic interaction between the second magnet 323 and the second coil 324. The second sensing magnet 327 may be disposed below the wing portion 321b of the second housing 321. With this structure, it is possible to minimize the magnetic interference between the second sensing magnet 327 and the second magnet 323 disposed to face upward on the upper side of the wing portion 321b.

As an alternative example, the second sensor 326 and the second sensing magnet 327 may be disposed with positions thereof switched.

The sensor receiving portion 328 may be formed in the third housing 312. The sensor receiving portion 328 may accommodate the second sensor 326. At least a portion of the sensor receiving portion 328 may have a shape corresponding to the second sensor 326.

The substrate 330 can electrically connect the light output module to an external configuration. The substrate 330 may be, for example, a flexible printed circuit board (FPCB). The substrate 330 may be electrically connected to the coils 314 and 324 and the sensors 316 and 326 of the light output module. The substrate 330 may be electrically connected to the first coil 314, the second coil 324, the first sensor 316, and the second sensor 326. The substrate 330 may have flexibility. The substrate 330 may be formed by bending a plurality of times.

The substrate 330 may comprise a first coil coupling portion 331, a second coil coupling portion 332, a third coil coupling portion 333, a fourth coil coupling portion 334, a first sensor coupling portion 335, a second sensor coupling portion 336, and an extension 337. However, at least any one of the first coil coupling portion 331, the second coil coupling portion 332, the third coil coupling portion 333, the fourth coil coupling portion 334, the first sensor coupling portion 335, the second sensor coupling portion 336, and the extension portion 337 in the substrate 330 may be omitted or modified. The substrate 330 may be integrally formed. However, it is not limited thereto.

The first and fourth coil coupling portions 331 and 334 may be positioned on the lower surface of the third housing 312. The first and fourth coil coupling portions 331 and 334 may be coupled to the second coil 324. The first and fourth coil coupling portions 331 and 334 can supply power to the second coil 324.

The second and third coil coupling portions 332 and 333 may be bent and extended from the first and fourth coil coupling portions 331 and 334. The second and third coil coupling portions 332 and 333 can connect the first coil coupling portion 331 and the fourth coil coupling portion 334 which are spaced apart from each other. The second and third coil coupling portions 332 and 333 may be positioned on the side surfaces of the third housing 312. The second and third coil coupling portions 332 and 333 may be coupled with the first coil 314. The second and third coil coupling portions 332 and 333 can supply power to the first coil 314.

The first sensor coupling portion 335 may extend upward from the fourth coil coupling portion 334. The first sensor coupling portion 335 may be positioned in the sensor receiving portion 328 formed in the third housing 312. The first sensor coupling portion 335 may be coupled to the second sensor 326. The second sensor 326 may be mounted on the first sensor coupling portion 335.

The second sensor coupling portion 336 may be bent and extended a plurality of times from the fourth coil coupling portion 334. The second sensor coupling portion 335 may be coupled to the first sensor 326. The first sensor 326 may be mounted on the second sensor coupling portion 335.

In the above, to have been described as all the components that make up the embodiments of the present invention may operate in combination, or combined into one, but the invention is not necessarily limited to these examples. That is, if the object in the scope of the present invention, may be that all of the components are selectively operates in conjunction with more than one. In addition, terms such as "inclusive and", "is configured" or "have" described above is because, which means that unless there is a particular of stated that, the component can be embedded, except for the different components it should not be construed to further comprise other components. All technical and scientific terms comprising terms, there is a one, the same meaning as commonly understood by one of ordinary skill in the art unless otherwise defined. As the term is defined in advance commonly used terms are to be interpreted to mean that match on the context of the relevant art, a, shall not be interpreted to have an idealistic or excessively formalistic meaning unless clearly defined in the present invention. In addition, the above-described coils and magnets operate through mutual interaction, and the positions of the coils and the magnets facing or corresponding to each other can be interchanged.

The above description is only to those described as the technical idea of the present invention by way of example, those skilled in the art that various modifications, additions and substitutions will be possible without departing from the essential characteristics of the present invention. Accordingly, the disclosed invention embodiments is for illustrative and not intended to limit the technical idea of the present invention, not by such an embodiment is the technical scope of the present invention is not limited. The scope of protection of the invention is to be interpreted by the following claims, all spirits within a scope equivalent will be construed as included in the scope of the present invention.

The invention claimed is:

1. A light output module comprising:
a first lens part comprising at least one lens;
a second lens part comprising at least one lens and disposed below the first lens part;
an actuator for moving the second lens part;
a third lens part comprising at least one lens and disposed below the second lens part; and
a light source disposed below the third lens part;
wherein the actuator comprises
a first housing accommodating the second lens part and having at least one first magnet disposed therein;
a second housing accommodating the first housing and having at least one second magnet disposed therein; and
a third housing comprising a first coil facing the first magnet and a second coil facing the second magnet,
wherein the first housing is driven relative to the second housing along a first direction, and
wherein the first housing and the second housing are driven relative to the third housing along a second direction different than the first direction.

2. The light output module according to claim 1, wherein the second lens part and the first housing move towards the first direction by the interaction between the first magnet and the first coil, and
wherein the second lens part, the first housing, and the second housing move towards the second direction by the interaction between the second magnet and the second coil.

3. The light output module according to claim 1, wherein when the second lens part moves towards the first direction, the second lens part and the first housing move integrally while the second housing is fixed, and when the second lens part moves towards the second direction, the second lens part, the first housing, and the second housing move integrally.

4. The light output module according to claim 1, wherein the first lens part comprises a first lens at least partially exposed upward and a second lens positioned below the first lens,
wherein the second lens part comprises a third lens positioned below the second lens and a fourth lens positioned below the third lens, and
wherein the third lens part comprises a fifth lens positioned below the fourth lens and a sixth lens positioned below the fifth lens.

5. The light output module according to claim 4, the light output module comprising a holder unit accommodating the first lens part, the third lens part, and the actuator, and fixing the first lens part and the third lens part.

6. The light output module according to claim 5, wherein the holder unit comprises a holder for accommodating the first lens part, the third lens part, and the actuator therein, and a cover which downwardly presses the peripheral portion of the upper surface of the first lens and is screw-coupled to the outer circumferential surface of the holder, and
wherein the third lens part comprises a lens barrel which accommodates the fifth lens and the sixth lens and is screw-coupled to the inner circumferential surface of the holder.

7. The light output module according to claim 4, wherein a diameter of the first lens is larger than a diameter of any one of the second to six sixth lenses.

8. The light output module according to claim 4, wherein a diameter of the second lens is larger than a diameter of the third lens, and smaller than a diameter of the first lens.

9. The light output module according to claim 4, wherein a diameter of the third lens corresponds with a diameter of the fourth lens.

10. The light output module according to claim 4, wherein the fifth lens is focusing lens, and the sixth lens is a collimating lens.

11. The light output module according to claim 1, wherein the second lens part is movable by 2.4 to 3.6 mm towards the first direction and is movable by 60 to 120 µm towards the second direction.

12. The light output module according to claim 1, wherein the first direction and the second direction are orthogonal.

13. The light output module according to claim 1, wherein the first direction and the second direction are perpendicular to an optical axis of a lens unit comprising the first to lens part, the second lens part and the third lens part.

14. The light output module according to claim 1, wherein a diameter of the first lens part is larger than a diameter of the second lens part.

15. The light output module according to claim 1, wherein a field of view (FOV) of a lens unit comprising the first to lens part, the second lens part and the third lens part is 100 to 160 degrees.

16. The light output module according to claim 1, wherein the actuator comprises a first guide portion disposed between the first housing and the second housing,
wherein the first housing is guided by the first guide portion, and
wherein the first guide portion comprises a plurality of guide balls disposed spaced apart from each other.

17. The light output module according to claim 1, wherein the actuator comprises a second guide portion disposed between the second housing and the third housing,
wherein the second housing is guided by the second guide portion, and wherein the second guide portion comprises a plurality of guide balls disposed spaced apart from each other.

18. The light output module according to claim 1, wherein the light source is a laser diode.

19. A LiDAR (Light Detection And Ranging) system comprising: a light output module for illuminating light onto an area to be illuminated; and a light receiving module for sensing light reflected from the area illuminated by the light output module, wherein the light output module comprises a first lens part comprising at least one lens, a second lens part comprising at least one lens and disposed below the first lens part, an actuator for moving the second lens part, a third lens part comprising at least one lens and disposed below the second lens part, and a light source disposed below the third lens part, wherein the actuator comprises a first housing accommodating the second lens part and having at least one first magnet disposed therein; a second housing accommodating the first housing and having at least one second magnet disposed therein; and a third housing comprising a first coil facing the first magnet and a second coil facing the second magnet, and wherein the first housing is driven relative to the second housing in a first direction, and the first housing and the second housing are driven relative to the third housing in a second direction different than the first direction.

* * * * *